US009401747B2

(12) United States Patent
Bao et al.

(10) Patent No.: US 9,401,747 B2
(45) Date of Patent: Jul. 26, 2016

(54) METHOD AND DEVICE FOR DATA TRANSMISSION

(75) Inventors: Dongshan Bao, Beijing (CN); Shenfa Liu, Beijing (CN); Jing Wang, Beijing (CN); Lijun Pan, Beijing (CN); Zhigang Yan, Beijing (CN)

(73) Assignee: Nufront Mobile Communications Technology Co., Ltd., Beijing (CN)

( * ) Notice: Subject to any disclaimer, the term of this patent is extended or adjusted under 35 U.S.C. 154(b) by 0 days.

(21) Appl. No.: 14/118,692

(22) PCT Filed: Mar. 16, 2012

(86) PCT No.: PCT/CN2012/072425
§ 371 (c)(1),
(2), (4) Date: Feb. 11, 2014

(87) PCT Pub. No.: WO2012/155636
PCT Pub. Date: Nov. 22, 2012

(65) Prior Publication Data
US 2014/0185697 A1 Jul. 3, 2014

(30) Foreign Application Priority Data

May 19, 2011 (CN) .......................... 2011 1 0130194
Jun. 3, 2011 (CN) .......................... 2011 1 0149746
Jul. 6, 2011 (CN) .......................... 2011 1 0189151
Feb. 14, 2012 (CN) .......................... 2012 1 0032518

(51) Int. Cl.
*H04L 1/02* (2006.01)
*H04B 7/04* (2006.01)
(Continued)

(52) U.S. Cl.
CPC ............ *H04B 7/0413* (2013.01); *H04L 1/0067*
(2013.01); *H04L 1/0068* (2013.01); *H04L 5/0023* (2013.01); *H04L 5/0046* (2013.01)

(58) Field of Classification Search
CPC ... H04L 5/0023; H04L 5/0046; H04L 1/0067;
H04L 1/0068; H04B 7/0413
USPC .................. 375/224, 260, 267, 299, 340, 347
See application file for complete search history.

(56) References Cited

U.S. PATENT DOCUMENTS 6,460,159 B1 * 10/2002 Kim et al. ...................... 714/790
7,301,890 B2 * 11/2007 Joo .................... H04L 27/2607
370/208
2005/0058217 A1 * 3/2005 Sandhu et al. ................. 375/267

(Continued)

FOREIGN PATENT DOCUMENTS

CN 101039512 A 9/2007
CN 101855838 A 10/2010

(Continued)

Primary Examiner — Syed Haider
(74) Attorney, Agent, or Firm — Morgan, Lewis & Bockius LLP

(57) ABSTRACT

Disclosed in the present invention is a method for data transmission. The method comprises the following steps: receiving coded bit streams; mapping said coded bit streams to every spatial stream. A device for implementing stream mapping, a device for implementing rate matching and a transmitter are also disclosed in the present invention. With the method and device in the present invention, compared with the current stream mapping method, the mapping is more uniform with higher gain in high order modulation and multi-streams circumstance in a closed-loop model. And the system performance of a radio communication system could be further improved.

10 Claims, 9 Drawing Sheets

(51) Int. Cl.
 *H04L 5/00* (2006.01)
 *H04L 1/00* (2006.01)

(56) References Cited

U.S. PATENT DOCUMENTS

| | | | | |
|---|---|---|---|---|
| 2005/0159115 A1* | 7/2005 | Sandhu | H04L 1/0068 | 455/101 |
| 2007/0230383 A1* | 10/2007 | Yune | H04L 1/0618 | 370/310 |
| 2009/0129334 A1* | 5/2009 | Ma et al. | | 370/331 |
| 2009/0141620 A1* | 6/2009 | Hwang et al. | | 370/210 |
| 2011/0197106 A1* | 8/2011 | Kishigami et al. | | 714/755 |
| 2012/0155571 A1* | 6/2012 | Yang | H04B 7/024 | 375/295 |

FOREIGN PATENT DOCUMENTS

| | | |
|---|---|---|
| CN | 101977171 A | 2/2011 |
| WO | 2010-093897 A2 | 8/2010 |

\* cited by examiner

METHOD AND DEVICE FOR DATA TRANSMISSION

CROSS-REFERENCE TO RELATED APPLICATION

This application claims the priority of CN Application No. 201110130194.3 filed on May 19, 2011 and titled "A COMMUNICATION SYSTEM", which is incorporated herein by reference in its entirety.

This application claims the priority of CN Application No. 201110149746.5 filed on Jun. 3, 2011 and titled "DATA TRANSMISSION METHOD, STREAM MAPPER AND TRANSMITTER IN A WIRELESS SYSTEM", which is incorporated herein by reference in its entirety.

This application claims the priority of CN Application No. 201110189151.2 filed on Jul. 6, 2011 and titled "METHOD FOR DATA TRANSMISSION, STREAM MAPPER, RATE MATCHER AND TRANSMITTER", which is incorporated herein by reference in its entirety.

This application claims the priority of CN Application No. 201210032518.4 filed on Feb. 14, 2012 and titled "METHOD AND DEVICE FOR DATA TRANSMISSION", which is incorporated herein by reference in its entirety.

FIELD OF THE INVENTION

The present invention relates to the technical field of wireless communications, and in particular, to a method and a device for data transmission.

BACKGROUND OF THE INVENTION

The existing IEEE 802.11n has defined stream mapping applicable to a MIMO system, and a stream mapping method for multiple streams is considered in the solution of the stream mapping. A stream mapper defined in IEEE 802.11n is used to map succeeding s bits to different space streams in a round-robin mode, where s is defined as s=max{Nbpsc(si)/2,1}, and a result of the IEEE 802.11n mapping is shown in FIG. 1.

Such a mapping method in the prior art will cause serious performance degradation to a multi-stream beamforming system at high-order modulation and a high code rate.

SUMMARY OF THE INVENTION

Therefore, the technical problem to be solved by the present invention is to provide a method for data transmission, an apparatus for stream mapping, an apparatus for rate matching and a transmitter, thereby improving the performance of a wireless communication system in a closed-loop mode. A brief summary is given below to provide a basic understanding of some aspects of the embodiments disclosed. This section of summary is not to provide a general commentary, or to determine the key/important elements or to describe the protection scopes of these embodiments, but is merely to simply present some concepts, which act as a preamble of the subsequent detailed illustration.

To solve the above technical problem, the invention provides a method for data transmission, including:
  receiving a coded bit stream; and
  mapping the coded bit stream to space streams.

In some optional embodiments, the method further includes:
  performing a cyclic shift operation on coded bits mapped to each space stream.

In some optional embodiments, a bit sequence $q_r^{si}$ of each space stream is outputted after performing a cyclic shift operation on coded bits $q_l^{si}$ mapped to the space stream in each OFDM symbol, wherein, $$r = [l + si \cdot N_{cbpsc}(si) \cdot N_{shift}] \bmod [N_{scpsym} \cdot N_{cbpsc}(si)];$$

si represents a space stream index; l=0, 1, 2, ..., $N_{scpsym} \cdot N_{cbpsc}(si)-1$; $N_{scpsym}$ represents the number of data subcarriers of each OFDM symbol; $N_{cbpsc}(si)$ represents the number of coded bits carried by each subcarrier in the space stream; and $N_{shift}$ is a cyclic delay factor.

In some optional embodiments, a bit sequence $q_r^{si}$ of each space stream is output after performing a cyclic shift operation on coded bits $q_l^{si}$ mapped to the space stream in each OFDM symbol, wherein, $$r = [l + si \cdot N_{cbpsc}(si) \cdot 37] \bmod [N_{scpsym} \cdot N_{cbpsc}(si)];$$

si represents a space stream index; l=0, 1, 2, ..., $N_{scpsym} \cdot N_{cbpsc}(si)-1$; $N_{scpsym}$ represents the number of data subcarriers of each OFDM symbol; $N_{cbpsc}(si)$ represents the number of coded bits carried by each subcarrier in the space stream.

In some optional embodiments, a bit is allocated to the sith space stream according to the following operation:

$$q_l^{si} = \begin{cases} \tilde{c}_{\left\lfloor \frac{l}{N_{cbpsc}(si)} \right\rfloor \cdot \sum_{n=0}^{N_{ss}-1} N_{cbpsc}(n) +} \sum_{i=1}^{l-1} \left\lfloor \frac{l}{N_{cbpsc}(si)} \right\rfloor \cdot N_{cbpsc}(si)} & l \leq \mathrm{Len\_cb}(si) - 1 \\ & \\ \mathrm{non} & l > \mathrm{Len\_cb}(si) \end{cases}$$

wherein, si represents a space stream index, si=0, 1, 2 ... $N_{ss}-1$; $\tilde{c}$ represents the inputted coded bit stream; $q_l^{si}$ represents a transmitted bit at time l of the sith space stream outputted by the stream mapping; n=0, 1, 2 ... $N_{ss}-1$; $N_{ss}^{si}(i)$ represents the number of parallel space streams when the ith bit is transmitted from the sith space stream; l represents bit indexes of the bits $q_l^{si}$ si outputted after the stream mapping of the sith space stream, l=0, 1, 2 ... Len_cb(si)-1; Len_cb(si) represents the number of coded bits allocated to the space stream si, Len_cb(si)=$N_{sympss} \cdot N_{scpsym} \cdot N_{cbpsc}$(si); $N_{sympss}$ represents the number of OFDM symbols of each space stream; $N_{scpsym}$ represents the number of subcarriers of each OFDM symbol; $N_{cbpsc}$ (si) represents the number of coded bits carried by each subcarrier in the space stream; $N_{cbpss}$(si) represents the number of coded bits carried by each OFDM symbol in the sith space stream, $N_{cbpss}(si)=N_{scpsym} \cdot N_{cbpsc}$(si); and non represents nonexistence of a bit.

In some optional embodiments, the method further includes:
  dividing Len_cb(si) bits into $N_{sympss} \cdot N_{scpsym}$ allocation periods, wherein, in each allocation period: for EQM modulation, $N_{ss}^{si}(i)=N_{ss}^{si}(j)$ 0≤i, j<Len_cb(si)-1; and for UEQM modulation, a sequence of inputted bits for the stream mapping are in a period of $$\sum_{si=0}^{N_{ss}-1} N_{cbpsc}(si),$$

and allocated sequentially among all space streams bit by bit;
  where, for one allocation period, when $N_{cbpsc}(si)$ bits are allocated to the sith space stream, the sith space stream quits subsequent stream mapping stages in the current allocation period; and in the next bit sequence period, the allocation process of the previous bit sequence period is repeated.

In some optional embodiments, for the sith space stream, the coded bit stream is mapped to the space streams according to the following operation:

$$\Omega^{si} \in I = \left\{ k \,\middle|\, k \in \left[0, 1, 2, \ldots, N_{sympss} \cdot \sum_{si=0}^{Nss-1} N_{cbpss}(si) - 1 \right] \right\};$$

I represents a set of subscripts of the inputted coded stream; k represents an index order of an inputted coded bit stream $\tilde{c}_k$ before stream mapping;

$\Omega^{si}$ represents a set of bit indexes k of the original coded bit stream corresponding to the bits of the sith space stream after stream mapping, and elements in the set $\Omega^{si}$ are calculated by the following formula:

$$\Omega^{si} = \left\{ k \,\middle|\, k = f^{si}(l) = \left\lfloor \frac{l}{N_{cbpsc}(si)} \right\rfloor \sum_{n=0}^{Nss-1} N_{cbpsc}(n) + \right.$$

$$\sum_{i=\left\lfloor \frac{i}{N_{cbpsc}(si)} \right\rfloor \cdot N_{cbpsc}(si)}^{l-1} N_{ss}^{si}(i) + si;$$

wherein, $l \in \{0, 1, \ldots, N_{scpsym} \cdot N_{cbpsc}(si) - 1\}\};$ $$f^{si}(l) = k = \left\lfloor \frac{l}{N_{cbpsc}(si)} \right\rfloor \sum_{n=0}^{Nss-1} N_{cbpsc}(n) + \sum_{i=\left\lfloor \frac{i}{N_{cbpsc}(si)} \right\rfloor \cdot N_{cbpsc}(si)}^{l-1} N_{ss}^{si}(i) + si =$$

$$\left\lfloor \frac{l}{N_{cbpsc}(si)} \right\rfloor \sum_{n=0}^{Nss-1} N_{cbpsc}(n) + \sum_{j=0}^{mod(l, N_{cbpsc}(si))-1} N_{ss}^{base}(j) + si;$$

si represents a space stream index, si=0, 1, 2 ... $N_{ss}$−1; k represents an index order of the inputted coded bit stream $\tilde{c}_k$ before stream mapping; $N_{ss}$ represents the number of parallel space streams; $N_{ss}^{si}(i)$ represents the number of parallel space streams when the ith bit is transmitted from the sith space stream; $N_{ss}^{base}(j)$ represents the number of parallel space streams when the jth bit is allocated to the sith space stream in the first allocation period, and at most $N_{cbpsc}(si)$ bits can be allocated to each space stream; $N_{cbpss}(si)$ represents the number of coded bits carried by each OFDM symbol in the sith space stream; $N_{cbpss}(si) = N_{scpsym} \cdot N_{cbpsc}(si)$; $N_{cbpsc}(si)$ represents the number of coded bits carried by each subcarrier in the sith space stream; $N_{scpsym}$ represents the number of subcarriers of each OFDM symbol; and $N_{sympss}$ represents the number of OFDM symbols of each space stream.

In some optional embodiments, the algorithm of calculating $N_{ss}^{si}(i)$ is as follows:

the coded bit stream is divided into $$N_{block} = \frac{N_{sympss} \sum_{si=0}^{Nss-1} N_{cbpss}(si)}{\sum_{si=0}^{Nss-1} N_{cbpsc}(si)} = N_{sympss} N_{scpsym}$$

allocation periods by taking the number $$\sum_{si=0}^{Nss-1} N_{cbpsc}(si)$$

of coded bits corresponding to one subcarrier of each OFDM symbol as the allocation period, bit-by-bit subcarrier allocation is performed in each allocation period successively; the number of parallel space streams when the jth bit is allocated to the sith space stream in the first allocation period is defined as $N_{ss}^{base}(j)$ then, the number of parallel space streams $N_{ss}^{si}(i)$ when the ith bit is allocated to the sith space stream is obtained according to a formula $N_{ss}^{si}(i) = N_{ss}^{base}(i \bmod N_{cbpsc}(si))$;

wherein, $N_{cbpss}(si)$ represents the number of coded bits carried by each OFDM symbol in the sith space stream, $N_{cbpss}(si) = N_{scpsym} \cdot N_{cbpsc}(si)$; $N_{cbpsc}(si)$ represents the number of coded bits carried by each subcarrier in the sith space stream; $N_{cbpsc}(si)$ represents the number of coded bits carried by each subcarrier in the sith space stream; $N_{ss}$ represents the number of parallel space streams; $N_{scpsym}$ represents the number of data subcarriers;

by taking the first allocation period as an example, the method for calculating $N_{ss}^{base}(j)$ is as follows:

first of all, an allocation stage number P is calculated according to the overall number of space streams $N_{ss}$ and a modulation order S of each space stream, wherein the number of space streams and bit occurrences are different from an allocation stage to another allocation stage, specifically as follows:

$$|S| = \sum_{si=0}^{Nss-1} N_{cbpsc}(si),$$

S represents a set of modulation bit numbers of each space stream, S={$N_{cbpsc}(0), N_{cbpsc}(1), N_{cbpsc}(2), \ldots, N_{cbpsc}(N_{ss}-1)$};

a set A=unique(S) is calculated; wherein, unique represents a set of numbers of different elements contained in the set S;

a set B=sort(A) is calculated; wherein, sort represents sorting the elements of the set A from small to large; the allocation stage number is calculated as P=length(B); each element in the set B represents the minimum modulation order of a stage for the element correspondingly;

then, the bit occurrence in each allocation stage is calculated, specifically as follows:

the occurrence of the pth stage is calculated as C(p)=B(p)−B(p−1); wherein, when p=0 at the 0th stage, then B(−1)=0, i.e., C(0)=B(0);

the number of parallel space streams $M_{ss}^{base}(p)$ of each stage is determined in sequence according to the above allocation stage number P calculated; then, the allocation stage for the jth bit allocated to each stream is determined, specifically as follows:

first of all, the number of parallel space streams $M_{ss}^{base}(p)$ in the stage p=0 is determined, $M_{ss}^{base}(0)=sum(S \geq B(0))$;

then, the bit range of the stage p=0 is calculated as [0,K(0)], wherein, K(0)=C(0)−1, and if j belongs to this range, it is regarded that j belongs to the 0th stage;

the number of parallel space streams base $M_{ss}^{base}(1)=sum(S \geq B(1))$ of the stage p=1 can be likewise determined;

then, the bit range of the 1st stage is calculated as [K(0)+1,K(1)], wherein, K(1)=K(0)+C(1); the bit range of each subsequent stage is likewise calculated in sequence; in conclusion, the allocation stage for the jth bit is determined according to a formula p=g(j), wherein, $$g(j) = \begin{cases} 0, & 0 <= j <= K(0) \\ 1, & K(0)+1 <= j <= K(1) \\ \vdots \\ p, & K(p-1)+1 <= j <= K(p) \\ \vdots \\ P-1, & K(P-2)+1 <= j <= K(P-1) \end{cases}$$

then, $N_{ss}^{base}(j)$ is obtained according to a formula $N_{ss}^{base}(j)=M_{ss}^{base}(g(j))$.

In some optional embodiments, the coded bit stream is mapped to each space stream bit by bit.

In some optional embodiments, bits with a coding constraint relation in the coded bit stream are mapped to the space streams.

In some optional embodiments, the coded bits with a coding constraint relation in the coded bit stream are sequentially allocated one by one to the bit allocatable space streams.

In some optional embodiments, the coded bit stream is a convolutional coded bit stream, or an LDPC coded bit stream.

In some optional embodiments, the coded bit stream is subjected to rate matching.

In some optional embodiments, the coded bit stream is subjected to rate matching based on a convolutional code of a code rate 5/8.

In some optional embodiments, a convolutional code of a code rate 1/2 is transformed to be of a code rate 5/8 through puncturing.

In some optional embodiments, the puncturing is implemented by deleting any location corresponding to an element 0 and reserving any location corresponding to an element 1 based on $\{_{11101}^{10111}\}$ or $\{_{11010}^{11111}\}$.

To solve the above technical problem, the invention further provides an apparatus for realizing stream mapping, including:

a receiving module, configured for receiving a coded bit stream; and a mapping module, configured for mapping the coded bit stream to space streams.

In some optional embodiments, the apparatus further includes:

a cyclic shift module, configured for performing a cyclic shift operation on coded bits mapped to each space stream.

In some optional embodiments, the cyclic shift module outputs a bit sequence $q_r^{si}$ of each space stream after performing a cyclic shift operation on coded bits $q_l^{si}$ mapped to the space stream in each OFDM symbol, wherein:

$$r=[l+si \cdot N_{cbpsc}(si) \cdot N_{shift}] \bmod [N_{scpsym} \cdot N_{cbpsc}(si)];$$

si represents a space stream index; l=0, 1, 2, . . . , $N_{scpsym} \cdot N_{cbpsc}(si)-1$; $N_{scpsym}$ represents the number of data subcarriers of each OFDM symbol; $N_{cbpsc}(si)$ represents the number of coded bits carried by each subcarrier in the sith space stream; and $N_{shift}$ represents a cyclic delay factor.

In some optional embodiments, the cyclic shift module outputs a bit sequence $q_r^{si}$ of each space stream after performing a cyclic shift operation on coded bits $q_l^{si}$ mapped to the space stream in each OFDM symbol, wherein:

$$r=[l+si \cdot N_{cbpsc}(si) \cdot 37] \bmod [N_{scpsym} \cdot N_{cbpsc}(si)];$$

si represents a space stream index; l=0, 1, 2, . . . , $N_{scpsym} \cdot N_{cbpsc}(si)-1$; $N_{scpsym}$ represents the number of data subcarriers of each OFDM symbol; and $N_{cbpsc}(si)$ represents the number of coded bits carried by each subcarrier in the sith space stream.

In some optional embodiments, the mapping module allocates a bit to the ith space stream as follows:

$$q_l^{si} = \begin{cases} \tilde{c}_{\left[\frac{l}{N_{cbpsc}(si)}\right] \cdot \sum_{n=0}^{N_{ss}-1} N_{cbpsc}(n) + \left[\sum_{i=\left[\frac{l-1}{N_{cbpsc}(si)}\right]}^{l-1} \cdot N_{cbpsc}(si)\right] N_{ss}^{si}(i)+si} & l \leq Len\_cb(si)-1 \\ non & l > Len\_cb(si) \end{cases}$$

wherein, si represents a space stream index, si=0, 1, 2 . . . $N_{ss}-1$; $\tilde{c}$ represents the inputted coded bit stream; $q_l^{si}$ represents a transmitted bit at time l of the sith space stream output by the stream mapping; n=0, 1, 2 . . . $N_{ss}-1$; $N_{ss}^{si}(i)$ represents the number of parallel space streams when the ith bit is transmitted from the sith space stream; l represents a bit index of the bits $q_l^{si}$ outputted after the stream mapping of the sith space stream, l=0, 1, 2 . . . Len_cb(si)−1; Len_cb(si) represents the number of coded bits allocated to the space stream, Len_cb(si)=$N_{sympss} \cdot N_{scpsym} \cdot N_{cbpsc}(si)$; $N_{sympss}$ represents the number of OFDM symbols of each space stream; $N_{scpsym}$ represents the number of data subcarriers of each OFDM symbol; $N_{cbpsc}(si)$ represents the number of coded bits carried by each subcarrier in the sith space stream; $N_{cbpss}(si)$ represents the number of coded bits carried by each OFDM symbol in the sith space stream, $N_{cbpss}(si)=N_{scpsym} \cdot N_{cbpsc}(si)$; and non represents nonexistence of a bit.

In some optional embodiments, the operation further includes:

dividing Len_cb)(si) bits into $N_{sympss} \cdot N_{scpsym}$ allocation periods, wherein, in each allocation period: for EQM modulation, $N_{ss}^{si}(i)=N_{ss}^{si}(j)$ 0≤j<Len_cb(si)−1; and for UEQM modulation, a sequence of inputted bits for the stream mapping are in a period of $$\sum_{si=0}^{N_{ss}-1} N_{cbpsc}(si),$$

and allocated sequentially among all space streams bit by bit;

for one allocation period, when $N_{cbpsc}(si)$ bits are allocated to the sith space stream, the ith space stream quits the subsequent stream mapping stages in the current period; and in the next bit sequence period, the allocation process of the previous bit sequence period is repeated.

In some optional embodiments, for the sith space stream, the coded bit stream is mapped to the space stream according to the following operation:

$$\Omega^{si} \in I = \left\{ k \mid k \in \left[0, 1, 2, \ldots, N_{sympss} \cdot \sum_{si=0}^{Nss-1} N_{cbpss}(si) - 1\right] \right\};$$

I represents a set of subscripts of the inputted coded stream; k represents an index order of an inputted coded bit stream $\tilde{c}_k$ before stream mapping;

$\Omega^{si}$ represents a set of bit indexes k of the original coded bit stream corresponding to the bits of the sith space stream after stream mapping, and the elements of set $\Omega^{si}$ may be calculated by the following formula:

$$\Omega^{si} = \left\{ k \mid k = f^{si}(l) = \left\lfloor \frac{l}{N_{cbpsc}(si)} \right\rfloor \sum_{n=0}^{Nss-1} N_{cbpsc}(n) + \sum_{i=\left\lfloor \frac{i}{N_{cbpsc}(si)} \right\rfloor \cdot N_{cbpsc}(si)}^{l-1} N_{ss}^{si}(i) + si; \right.$$

where, $l \in \{0, 1, \ldots, N_{sympss} \cdot N_{scpsym} \cdot N_{cbpsc}(si) - 1\}\}$;

$$f^{si}(l) = k = \left\lfloor \frac{l}{N_{cbpsc}(si)} \right\rfloor \sum_{n=0}^{Nss-1} N_{cbpsc}(n) + \sum_{i=\left\lfloor \frac{i}{N_{cbpsc}(si)} \right\rfloor \cdot N_{cbpsc}(si)}^{l-1} N_{ss}^{si}(i) + si =$$

$$\left\lfloor \frac{l}{N_{cbpsc}(si)} \right\rfloor \sum_{n=0}^{Nss-1} N_{cbpsc}(n) + \sum_{j=0}^{mod(l,N_{cbpsc}(si))-1} N_{ss}^{base}(j) + si;$$

si represents a space stream index, si=0, 1, 2 ... $N_{ss}$−1; k represents an index order of the inputted coded bit stream $\tilde{c}_k$ before stream mapping; N represents the number of parallel space streams; $N_{ss}^{si}(i)$ represents the number of parallel space streams when the ith bit is transmitted from the sith space stream; $N_{cbpss}(si)$ represents the number of coded bits carried by each OFDM symbol in the $si^{th}$ space stream; $N_{cbpss}(si) = N_{scpsym} \cdot N_{cbpsc}(si)$; $N_{cbpsc}(si)$ represents the number of coded bits carried by each subcarrier in the $si^{th}$ space stream; $N_{scpsym}$ represents the number of subcarriers of each OFDM symbol; and $N_{sympss}$ represents the number of OFDM symbols of each space stream.

In some optional embodiments, the algorithm of calculating $N_{ss}^{si}(i)$ is as follows:

the coded bit stream is divided into $$N_{block} = \frac{N_{sympss} \sum_{si=0}^{Nss-1} N_{cbpss}(si)}{\sum_{si=0}^{Nss-1} N_{cbpsc}(si)} = N_{sympss} N_{scpsym}$$

allocation periods by taking the number $$\sum_{si=0}^{Nss-1} N_{cbpsc}(si)$$

of coded bits corresponding to one subcarrier of each OFDM symbol as the allocation period; bit-by-bit subcarrier allocation is performed in each allocation period successively; the number of parallel space streams when the jth bit is allocated to the sith space stream in the first allocation period is defined as; then, the number of parallel space streams $N_{ss}^{si}(i)$ when the ith bit is allocated to the sith space stream is obtained according to a formula $N_{ss}^{si}(i) = N_{ss}^{base}$ (i mod $N_{cbpsc}(si)$);

Where, $N_{cbpss}(si)$ represents the number of coded bits carried by each OFDM symbol in the sith space stream, $N_{cbpss}(si) = N_{scpsyn} \cdot N_{cbpsc}(si)$; $N_{cbpsc}(si)$ represents the number of coded bits carried by each subcarrier in the $si^{th}$ space stream; $N_{sympss}$ represents the number of OFDM symbols of each space stream; $N_{ss}$ represents the number of parallel space streams; and $N_{scpsym}$ represents the number of data subcarriers;

By taking the first allocation period as an example, the method for calculating $N_{ss}^{base}(j)$ is as follows:

first of all, an allocation stage number P is calculated according to the overall space stream number $N_{ss}$ and the modulation order S of each space stream, wherein the number of space streams and bit occurrences are different from an allocation stages to another allocation stage, specifically as follows:

$$|S| = \sum_{si=0}^{Nss-1} N_{cbpsc}(si),$$

S represents a set of modulation bit numbers of each space stream, $S = \{N_{cbpsc}(0), N_{cbpsc}(1), N_{cbpsc}(2), \ldots, N_{cbpsc}(N_{ss}−1)\}$;

a set A=unique(S) is calculated; wherein, unique represents a set of numbers of different elements contained in the set S;

a set B=sort(A) is calculated; wherein sort represents sorting the elements of the set A from small to large; the allocation stage number is calculated as P=length(B); and each element in the set B represents the minimum modulation order of a stage for the element correspondingly;

then, the bit occurrence in each allocation stage is calculated, specifically as follows:

the occurrence of the pth stage is C(p)=B(p)−B(p−1); wherein, when p=0 at the 0th stage, then B(−1)=0, i.e., C(0)=B(0);

the number of parallel space streams $M_{ss}^{base}(p)$ of each stage is determined in sequence according to the above allocation stage number P calculated; then, the allocation stage for the jth bit allocated to each stream is determined, specifically as follows:

first of all the number of parallel space streams $M_{ss}^{base}(p)$ of the stage p=0 is determined, $M_{ss}^{base}(0)=\text{sum}(S \geq B(0))$;

then, the bit range of the stage p=0 is calculated as [0,K(0)], wherein, K(0)=C(0)−1, and if j belongs to this range, it is regarded that j belongs to the 0th stage;

the number of parallel space streams $M_{ss}^{base}(1)=\text{sum}(S \geq B(1))$ of the stage p=1 can be likewise determined;

then, the bit range of the 1st stage is calculated as [K(0)+1,K(1)], wherein, K(1)=K(0)+C(1); the bit range of each subsequent stage is likewise calculated in sequence; in conclusion, the allocation stage for the jth bit is determined according to a formula p=g(j), wherein, $$g(j) = \begin{cases} 0, & 0 <= j <= K(0) \\ 1, & K(0)+1 <= j <= K(1) \\ \vdots \\ p, & K(p-1)+1 <= j <= K(p) \\ \vdots \\ P-1, & K(P-2)+1 <= j <= K(P-1) \end{cases}$$

then, $N_{ss}^{base}(j)$ is obtained according to a formula $N_{ss}^{base}(j) = M_{ss}^{base}(g(j))$.

In some optional embodiments, the coded bit stream is mapped to the space streams bit by bit.

In some optional embodiments, the mapping module maps the coded bits with a coding constraint relation in the coded bit stream to the space streams.

In some optional embodiments, the mapping module sequentially allocates the bits with a coding constraint relation in the bit stream one by one to each bit allocatable space stream.

In some optional embodiments, the modulation orders of the space streams are the same or different; wherein:

if the modulation orders of the space streams are the same, the same number of bits are allocated to each space stream; or if the modulation orders of the space streams are different, a different number of bits are allocated to each space stream.

In some optional embodiments, the coded bit stream is a convolutional coded bit stream, or an LDPC coded bit stream.

In some optional embodiments, the coded bit stream is subjected to rate matching.

To solve the above technical problem, the invention further provides an apparatus for realizing rate matching, wherein rate matching is performed based on a convolutional code of a code rate ⅝, and the apparatus includes:

a first module, configured for receiving a convolutional code; and a second module, configured for transforming a convolutional code of a code rate ½ to be of a code rate ⅝ through puncturing.

In some optional embodiments, the puncturing is implemented by deleting any location corresponding to an element 0 and reserving any location corresponding to an element 1 based on $$\begin{Bmatrix} 10111 \\ 11101 \end{Bmatrix} \text{ or } \begin{Bmatrix} 11111 \\ 11010 \end{Bmatrix}.$$

To solve the above technical problem, the invention further provides a transmitter, including:

a scrambling unit, configured for scrambling an inputted data bit stream;

a channel coding unit, configured for coding the scrambled data bit stream;

a rate matching unit, configured for performing rate matching on the coded bit stream;

a stream mapping unit, configured for mapping the coded bit stream subjected to the rate matching to the space stream; and an interleaving unit, configured for performing an interleaving operation on each space stream respectively.

In some optional embodiments, the stream mapping unit is further adapted to perform a cyclic shift operation on coded bits mapped to each space stream.

In some optional embodiments, the stream mapping unit includes the receiving module, the mapping module and the cyclic shift module described above.

In some optional embodiments, the stream mapping unit includes the receiving module and the mapping module described above.

In some optional embodiments, the scrambling unit includes a receiving module, a scrambling module and an outputting module; wherein:

the scrambling module scrambles a data bit sequence $[b_0 b_1 \ldots b_{Len\_bit-1}]$ by a scrambling sequence which is a binary sequence $[s_0 s_1 \ldots s_{Len\_bit-1}]$ outputted by a maximum length linear feedback shift register with a generator polynomial $1+X^{11}+X^{15}$, specifically, performs an Exclusive-OR operation on the data bit sequence and the scrambling sequence according to the following formula bit by bit to obtain a scrambled bit sequence $[\tilde{b}_0 \tilde{b}_1 \ldots \tilde{b}_{Len\_bit-1}]$: $\tilde{b}_i = (b_i + s_i) \bmod 2$, $i=0, 1, \ldots$ Len_bit-1.

In some optional embodiments, the channel coding unit performs convolutional coding or LDPC code coding on the inputted bit stream.

In some optional embodiments, the rate matching unit is adapted to perform rate matching based on a convolutional code of a code rate ⅝, and includes:

a first module, configured for receiving a convolutional code; and a second module, configured for transforming a convolutional code of a code rate ½ to be of a code rate ⅝ through puncturing.

In some optional embodiments, the puncturing is implemented by deleting any location corresponding to an element 0 and reserving any location corresponding to an element 1 based on $$\begin{Bmatrix} 10111 \\ 11101 \end{Bmatrix} \text{ or } \begin{Bmatrix} 11111 \\ 11010 \end{Bmatrix}.$$

The invention proposes a general method for stream mapping, an apparatus for realizing stream mapping, an apparatus for realizing rate matching and the structure of a transmitter. With the technical solutions of the invention, in the case of high-order modulation and multi-stream in a closed-loop mode, the mapping is more uniform with and the gain is improved in comparison with the existing stream mapping method. With the method of the invention, the system performance of a wireless communication system can be further improved. The stream mapping scheme provided in the invention is simple and easy to implement.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunction with the drawings, and all the embodiments disclosed intend to contemplate all these aspects and their equivalents.

DETAILED DESCRIPTION OF THE EMBODIMENTS

Figure 1:
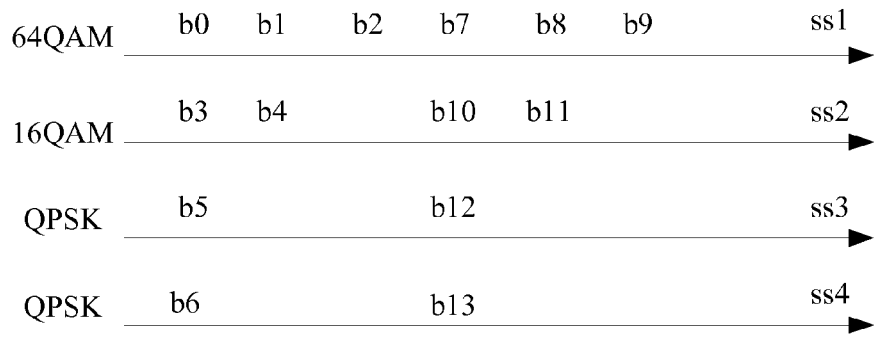
FIG. 1 is a schematic diagram of stream mapping in IEEE 802.11 as described in the section of background technology of the invention.

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

Principles and characteristics of the method and system described below may be applied to various communication systems, although the embodiments will be described in the environment of a wireless communication system below for the purpose of exemplification. Nevertheless, the general principles described below are also applicable to other communication systems based on different communication protocols. However, the scope of the invention is defined by the appended claims, without limitation by the specific embodiments described below.

According to a great volume of analysis and verification, the performance of the stream mapping based on the existing IEEE802.11n is effected severely during a beamforming operation because relatively numerous continuous coded bits are allocated to a space stream with a poor channel quality. In view of the defects in the prior art, the invention proposes a method for data transmission in a wireless system, which may improve the performance of the wireless system in a closed loop. This method is applicable to various wireless communication systems, MIMO systems and MIMO OFDM systems.

Below are some technical terms in the invention:

Modulation and Coding Scheme (MCS): a combination of a specific modulation scheme and a coding rate employed by a space stream;

EQM: Equal Modulation;

UEQM: Unequal Modulation;

Space Stream: a data stream transmitted parallelly in space;

Space Time Stream: a space-time coded stream obtained from space-time coding of a space stream;

$N_{sympss}$: the number of OFDM symbols of each space stream;

$N_{scpsym}$: the number of data subcarriers of each OFDM symbol;

$N_{cbpss}$: the number of coded bits carried by each OFDM symbol;

$N_{cbpsc}$: the number of coded bits carried by each subcarrier;

si: space stream index;

$N_{cbpss}(si)$: the number of coded bits carried by each OFDM symbol in the sith space stream;

$N_{cbpsc}(si)$: the number of coded bits carried by each subcarrier in the sith space stream;

$N_{ss}$: the number of parallel space streams;

$N_{ss}^{si}(i)$: the number of parallel space streams when the ith bit is transmitted;

Len_cb(si): the number of coded bits allocated to a space stream si;

$q_l^{si}$: a transmitted bit at time 1 of the sith space stream outputted from stream mapping; and l: a bit index of an outputted bit $q_l^{si}$ after the stream mapping of the sith space stream.

The solutions of embodiments of the invention will be illustrated in detail below via a several embodiments, respectively.

A First Embodiment

The first embodiment of the invention provides a method for data transmission in a wireless system is provided, where space bit streams are obtained by performing a bit-by-bit stream mapping operation on an inputted coded bit stream, so that coded bits with a coding constraint relation in the inputted coded bit stream are uniformly mapped to space streams via a stream mapping apparatus.

Figure 2:
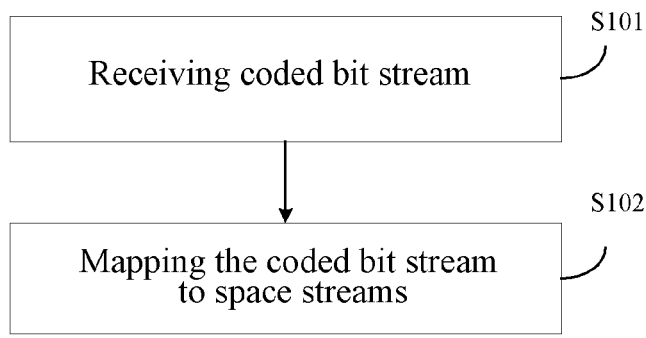
FIG. 2 is an exemplary flow chart of a method for data transmission according to an embodiment of the invention.

As shown in FIG. 2, the stream mapping operation specifically includes the following two steps:

Step S201: receiving a coded bit stream; and

Step S202: mapping the coded bit stream to space streams.

Preferably, the coded bit stream is mapped to the space streams bit by bit.

Preferably, bits with a coding constraint relation in the coded bit stream are mapped to the space streams.

Step S202 may be performed in various modes. Preferably, in an optional mode, coded bits with a coding constraint relation in the coded bit stream are sequentially allocated bit by bit to the space streams.

The so-called coded bit stream refers to a data bit stream subjected to channel coding. Preferably, the channel coding may be convolutional coding. Preferably, the channel coding may be Low-Density Parity-Check (LDPC) code coding.

Preferably, the mapping is specifically realized as follows.

Various space streams may employ the same modulation order or different modulation orders. Each space stream contains $N_{sympss} \cdot N_{scpsym}$ modulation symbols. If each space stream employs the same modulation order, the same number of bits are allocated to each space stream; otherwise, each space stream is allocated with a different number of bits. For the sith space stream, the allocated bits may be labeled as $[q_0^{si}\ q_1^{si} \ldots q_{Len\_cb(si)-1}^{si}]$. Here, Len_cb(si) denotes the number of coded bits allocated to the space stream si.

If l=0, 1, 2 ... Len_cb(si)-1, then $$q_l^{si} = \begin{cases} \tilde{c}_{\left\lfloor \frac{l}{N_{cbpsc}(si)} \right\rfloor \cdot \sum_{n=0}^{N_{ss}-1} N_{cbpsc}(n) + \sum_{i=\left\lfloor \frac{l}{N_{cbpsc}(si)} \right\rfloor}^{l-1} N_{cbpsc}(si) \cdot N_{ss}^{si}(i) + si} & l \le Len\_cb(si) - 1 \\ non & l > Len\_cb(si) \end{cases}$$

where, si represents a space stream index, si=0, 1, 2 ... $N_{ss}$−1; $\tilde{c}$ represents the inputted coded bit stream; $q_l^{si}$ represents a transmitted bit at time l of the sith space stream outputted by the stream mapping; n=0, 1, 2 ... $N_{ss}$−1; $N_{ss}^{si}(i)$ represents the number of parallel space streams when the ith bit is transmitted from the sith space stream, l represents a bit index of a bit $q_l^{si}$ outputted after the stream mapping of the sith space stream, l=0, 1, 2 ... Len_cb(si)−1; Len_cb(si) represents the number of coded bits allocated to a space stream si, Len_cb(si)=$N_{sympss} \cdot N_{scpsym} \cdot N_{cbpsc}$(si); $N_{sympss}$ represents the number of OFDM symbols of each space stream; $N_{scpsym}$ represents the number of data subcarriers of each OFDM symbol; $N_{cbpsc}$(si) represents the number of coded bits carried by each subcarrier in the sith space stream; $N_{cbpss}$(si) represents the number of coded bits carried by each OFDM symbol in the sith space stream, $N_{cbpss}$(si)=$N_{scpsym} \cdot N_{cbpsc}$(si); and non represents nonexistence of a bit.

Preferably, Len_cb(si) bits are totally divided into $N_{sympss} \cdot N_{scpsym}$ allocation periods. In each of the allocation periods, for EQM modulation, $N_{ss}^{si}(i) = N_{ss}^{si}(j)$ 0≤j<Len_cb(si)−1; and for UEQM modulation, the sequence of inputted bits for the stream mapping are allocated sequentially one by one among all space streams in a period of $$\sum_{si=0}^{N_{ss}-1} N_{cbpsc}(si).$$

For one allocation period, when $N_{cbpsc}$(si) bits have been allocated to the sith space stream, the sith space stream quits the subsequent stream mapping stages in the current period. In the next bit sequence period, the allocation process of the previous bit sequence period is repeated. For example, if MCS=77, for the 0th space stream, $N_{ss}(i)$=[4 4 2 2 4 4 2 2 ... ]; and for the 2nd space stream, $N_{ss}(i)$=[4 4 4 4 ... ].

Figure 3:
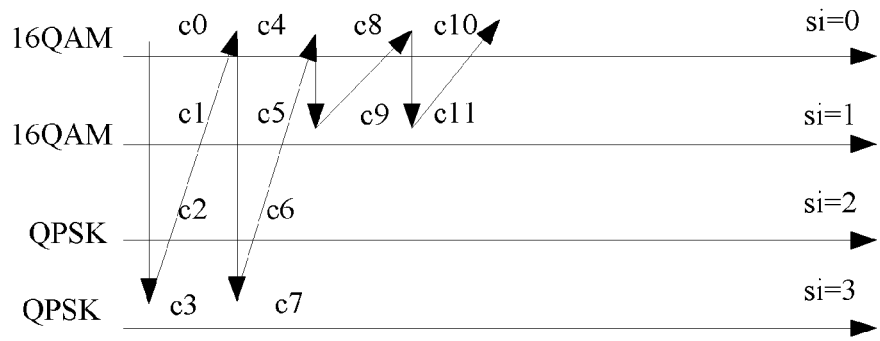
FIG. 3 is a schematic diagram of an example of stream mapping result in a specific example according to a first embodiment of the invention.

A result after the stream mapping may be obtained from the above calculation, where, the result of the first allocation period is shown in FIG. 3.

When the space streams are transmitted in parallel, space streams to which each code word is to be mapped is indicated in a control channel.

Preferably, the algorithm of calculating $N_{ss}^{si}(i)$ is specifically described below.

First of all, by taking the number of coded bits $$\sum_{si=0}^{N_{ss}-1} N_{cbpsc}(si)$$

corresponding to one subcarrier for each OFDM symbol as an allocation period, the coded bit stream is divided into $$N_{block} = \frac{N_{sympss} \sum_{si=0}^{N_{ss}-1} N_{cbpss}(si)}{\sum_{si=0}^{N_{ss}-1} N_{cbpsc}(si)} = N_{sympss} N_{scpsym}$$

allocation periods; bit-by-bit subcarrier allocation is performed for each allocation period successively; $N_{ss}^{base}(j)$ is defined as the number of parallel space streams when the jth bit is allocated to the sith space stream; finally, the number of parallel space streams $N_{ss}^{si}(i)$ when the ith bit is allocated to the sith space stream is obtained.

$N_{cbpss}$(si) is the number of coded bits carried by each OFDM symbol in the sith space stream, $N_{cbpss}$(si)=$N_{scpsym} \cdot N_{cbpsc}$(si); $N_{cbpsc}$(si) is the number of coded bits carried by each subcarrier in the sith space stream; $N_{sympss}$ is the number of OFDM symbols of each space stream; $N_{ss}$ is the number of parallel space streams; and $N_{scpsym}$ is the number of data subcarriers of each OFDM symbol.

By taking the first allocation period as an example, the method for calculating $N_{ss}^{base}(j)$ is as follows.

First of all, an allocation stage number P is calculated according to the overall number $N_{ss}$ of space streams and the modulation order S of each space stream, with the number of parallel space streams in the same allocation stage being the same, and the space stream number and a bit occurrence of an allocation stage are different from those of a different allocation stage, specifically as follows:

$$|S| = \sum_{i=0}^{N_{ss}-1} N_{cbpsc}(si),$$

S denotes a set of modulation bit numbers of each space stream, $S=\{N_{cbpsc}(0), N_{cbpsc}(1), N_{cbpsc}(2), \ldots, N_{cbpsc}(N_{ss}-1)\}$;

a set A=unique(S) is calculated; where, unique represents a set of numbers of different elements contained in the set S;

a set B=sort(A) is calculated; where, sort represents sorting the elements of the set A from small to large; the number of allocation stages P=length(B) is calculated; and each element in the set B represents the minimum modulation order of the corresponding stage for the element;

then, the bit occurrence in each allocation stage is calculated, specifically as follows:

the bit occurrence of the pth stage is C(p)=B(p)B(p−1); where, if p=0 at the 0th stage, B(−1)=0, that is, C(0)=B(0);

The number $M_{ss}^{base}(p)$ of parallel space streams of each stage is determined sequentially according to the above calculated allocation stage number p; then, the allocation stage of the jth bit allocated to each stream is determined, specifically as follows:

first of all, the number $M_{ss}^{base}(p)$ of parallel space streams at the $0^{th}$ (p=0) stage is determined, $M_{ss}^{base}(0)$=sum(S≥B(0)). For example, (4, 4, 2)>=2−>(1, 1, 1).

then, the bit range at the $0^{th}$ (p=0) stage is calculated as [0,K(0)], where, K(0)=C(0)−1, if j belongs to this range, it is regarded that j belongs to the 0th stage.

similarly, the number of parallel space streams $M_{ss}^{base}$=sum(S≥B(1)) of the 1st (p=1) stage may be determined;

then, the bit range of the 1st stage is calculated as [K(0)+1,K(1)], where K(1)=K(0)+C(1); the bit range of each subsequent stage may be likewise calculated sequentially; thus, the allocation stage for the jth bit is determined according to a formula p=g(j), where, $$g(j) = \begin{cases} 0, & 0 <= j <= K(0) \\ 1, & K(0)+1 <= j <= K(1) \\ \vdots \\ p, & K(p-1)+1 <= j <= K(p) \\ \vdots \\ P-1, & K(P-2)+1 <= j <= K(P-1) \end{cases}$$

then, $N_{ss}^{base}(j)$ is obtained according to a formula $N_{ss}^{base}(j)=M_{ss}^{base}(g(j))$.

The above description is given by taking an algorithm of calculating $N_{ss}^{si}(i)$ as an example, but the algorithm of calculating $N_{ss}^{si}(i)$ is not limited to the above.

The process of stream mapping will be described below referring to FIG. 4, for example.

In the case of 4 space streams, $N_{ss}=4$, for example, Len_cb(si)=6 if si=0, that is, if si=0, the bit length that may be allocated to the sith space stream is 6, $N_{cbpsc}(0)=6$; Len_cb(si)=4 if si=1, that is, if si=1, the bit length that may be allocated to the sith space stream is 4, $N_{cbpsc}(1)=4$; Len_cb(si)=2 if si=2, that is, if si=2, the bit length that may be allocated to the sith space stream is 2, $N_{cbpsc}(2)=2$; and Len_cb(si)=2 if si=3, that is, if si=3, the bit length that may be allocated to the sith space stream is 2, $N_{cbpsc}(3)=2$. Thus, S={6, 4, 2, 2}.

Here, $N_{ss}^{base}(j)$ is calculated by taking the first allocation period as an example, and $$|S| = \sum_{i=0}^{N_{ss}-1} N_{cbpsc}(si) = 14$$

bits are allocated bit stream by bit stream. This process is divided into a plurality of allocation stages, and the number of parallel space streams in each allocation stage is different from that in any other allocation stage.

Preferably, first of all, an allocation stage number P is calculated in a method as follows:

$A$=unique($S$)={6,4,2};

$B$=sort($A$)={2,4,6};

the allocation stage number P=length(B)=3;

the bit occurrence of the first allocation stage C(0)=B(0);

the bit occurrence of the second allocation stage C(1)=B(1)−B(0); and the bit occurrence of the third allocation stage C(2)=B(2)−B(1).

First of all, the allocation stage number P is calculated as 3, B(0)=2, B(1)=4 and B(2)=6, according to the above formula. The bit occurrences of the allocation stages are C(0)=2, C(1)=2 and C(2)=2, respectively. Then, the number of parallel space streams of each bit is calculated by, first of all, determining the pth allocation stage for an inputted bit according to the sequence number j of the inputted bit, and then calculating the number of parallel space streams of different stages and the bit range of each stage, specifically as follows:

The number of parallel space streams of the 0th stage is:

$M_{ss}^{base}(p)$=sum(S≥B(p))=sum([6,4,2,2]≥2)=sum([1,1,1,1])=4,p=0, and the bit range of the 0th stage is [0,K(0)], where K(0)=C(0)−1=2−1=1;

the number of parallel space streams of the 1st stage is:

$M_{ss}^{base}(1)$=sum(S≥B(1))=sum([6,4,2,2]≥4)=sum([1,1])=2;

and the bit range of the 1st stage is [K(0)+1, K(1)], where K(1)=K(0)+C(1)=1+2=3; and the number of parallel space streams of the 2nd stage is:

$M_{ss}^{base}(2)$=sum(S≥B(2))=sum([6,4,2,2]≥6)=sum([1])=1;

and the bit range of the 2nd stage is [K(1)+1, K(2)], where K(2)=K(1)+C(2)=3+2=5.

Then, the number of parallel space streams $N_{ss}^{base}(j)$ of the jth bit in the first allocation period is calculated according to a formula $N_{ss}^{base}(j)=M_{ss}^{base}(g(j))$:

$N_{ss}^{base}(0)=M_{ss}^{base}(g(0))=4,j=0,g(0)=0$;

$N_{ss}^{base}(1)=M_{ss}^{base}(g(1))=4,j=1,g(1)=0$;

$N_{ss}^{base}(2)=M_{ss}^{base}(g(2))=2,j=2,g(2)=1$;

$N_{ss}^{base}(3)=M_{ss}^{base}(g(3))=2,j=3,g(3)=1$;

$N_{ss}^{base}(4)=M_{ss}^{base}(g(4))=1,j=4,g(4)=2$; and $N_{ss}^{base}(5)=M_{ss}^{base}(g(5))=1,j=5,g(5)=2$.

Then, $N_{ss}^{si}(i)$ is obtained according to a formula $N_{ss}^{si}(i) = N_{ss}^{base}(i \mod N_{cbpsc}(si))$ as follows.

If $si=0, N_{ss}^0(i) = [4\ 4\ 2\ 2\ 1\ 1, 4\ 4\ 2\ 2\ 1\ 1, \ldots, 4\ 4\ 2\ 2\ 1\ 1]$.

(4 4 2 2 1 1 is directed to one allocation period, and 4 4 2 2 1 1, 4 4 2 2 1 1, ..., 4 4 2 2 1 1 are multiple occurrences of the result for one allocation period)

If $si=1, N_{ss}^1(i) = [4\ 4\ 2\ 2, 4\ 4\ 2\ 2, \ldots, 4\ 4\ 2\ 2]$.

If $si=2, N_{ss}^2(i) = [4\ 4, 4\ 4, \ldots, 4\ 4]$.

If $si=3, N_{ss}^3(i) = [4\ 4, 4\ 4, \ldots, 4\ 4]$.

Finally, the sequence numbers of space streams contained in each stage are determined, and mapping is performed according to a formula below:

$$q_l^{si} = \begin{cases} \tilde{c}_{\left\lfloor \frac{l}{N_{cbpsc}(si)} \right\rfloor \sum_{n=0}^{N_{ss}-1} N_{cbpsc}(n) + \sum_{i=\left\lfloor \frac{l}{N_{cbpsc}(si)} \right\rfloor \cdot N_{cbpsc}(si)}^{l-1} N_{ss}^{si}(i) + si} & l \leq \text{Len\_cb}(si) - 1 \\ \text{non} & l > \text{Len\_cb}(si). \end{cases}$$

When $l=0$, in the case of 4 streams, $q_0^0, q_0^1, q_0^2, g_0^3$ correspond to c0, c1, c2, c3, respectively;

When $l=1$, in the case of 4 streams, $q_1^0, q_1^1, q_1^2, q_1^3$ correspond to c4, c5, c6, c7, respectively;

When $l=2$, in the case of 4 streams, $q_2^0, q_2^1, q_2^2, q_2^3$ correspond to c8, c9, c16, c17, respectively;

When $l=3$, in the case of 4 streams, $q_3^0, q_3^1, q_3^2, q_3^3$ correspond to c10, c11, c20, c21, respectively;

When $l=4$, in the case of 4 streams, $q_4^1, q_4^1, q_4^2, q_4^3$ correspond to c12, c15, c30, c31, respectively;

When $l=5$, in the case of 4 streams, $q_5^0, q_5^1, q_5^2, q_5^3$ correspond to c13, c19, c34, c35, respectively;

When $l=6$, in the case of 4 streams, $q_6^0, q_6^1, q_6^2, q_6^3$ correspond to c14, c23, c44, c45, respectively; and so on.

Figure 4:
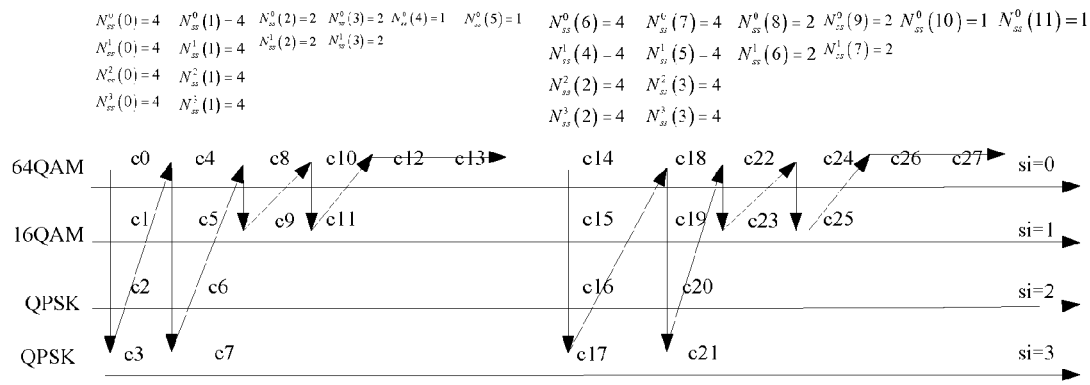
FIG. 4 is a schematic diagram of an example of stream mapping result in another specific example according to the first embodiment of the invention.

The obtained result after the stream mapping is shown in FIG. 4. FIG. 4 only shows the results of the first and the second allocation stages.

Figure 5:
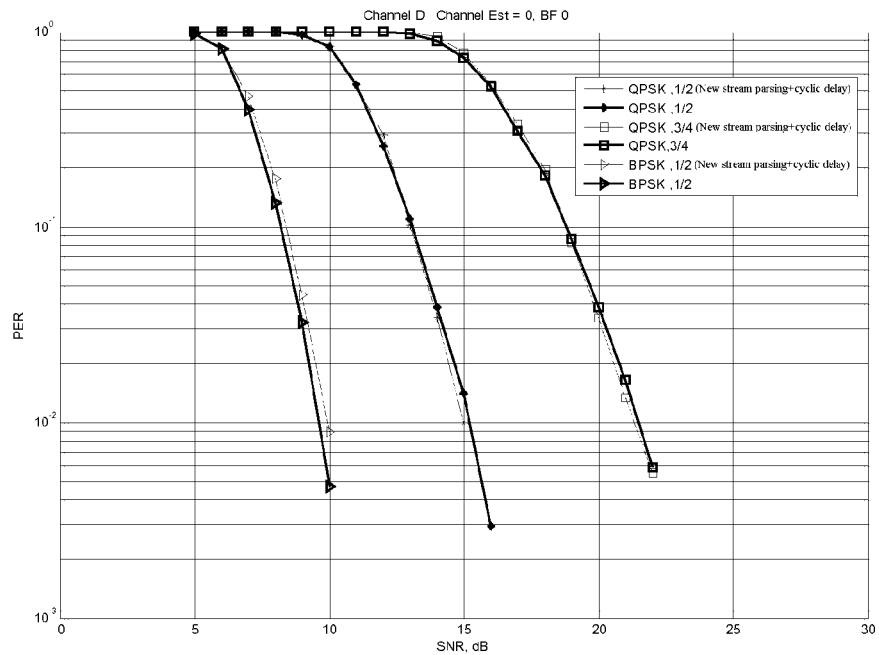
FIG. 5 is a schematic simulation diagram showing the comparison of performance between the open-loop mode of an embodiment of the invention and IEEE 802.11n.
Figure 6:
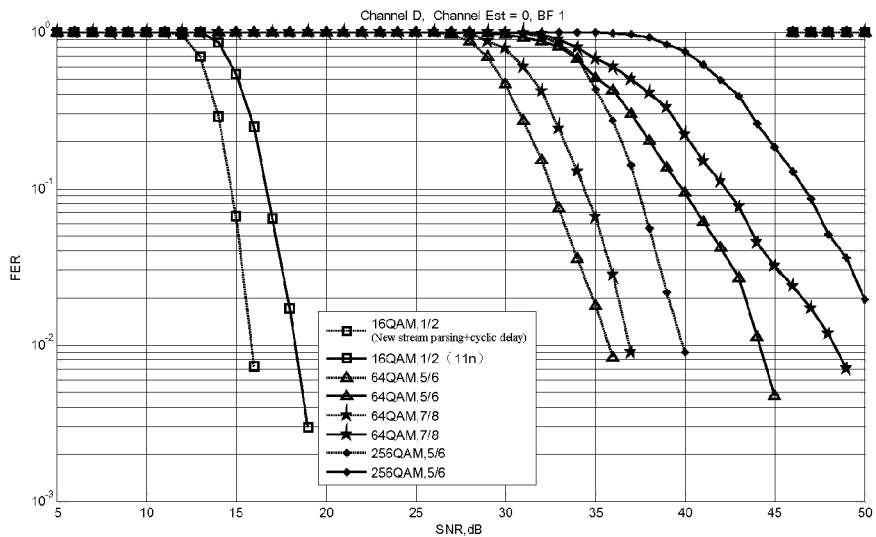
FIG. 6 is a schematic simulation diagram showing the comparison of performance between the closed-loop mode of an embodiment of the invention and IEEE 802.11n.

With the method for data transmission, i.e., the method for stream mapping, or the apparatus for stream mapping according to the first embodiment of the invention, the simulation in the MIMO environment shows that the performance of the inventive solutions in the case of an open loop mode is comparable with that of IEEE 802.11n, as shown in FIG. 5. In a closed-loop mode, however, in the case of high-order modulation and multiple streams, a large gain may be obtained in comparison with the IEEE 802.11n algorithm, as shown in FIG. 6. It is indicated by the simulation result that, system performance of a wireless communication system can be further improved by the invention.

A Second Embodiment

The second embodiment of the invention provides a method for data transmission in a wireless system, where space bit streams are obtained by performing a bit-by-bit stream mapping operation on an inputted coded bit stream, so that bits with a coding constraint relation in the inputted coded bit stream are mapped to space streams via a stream mapping apparatus.

As shown in FIG. 2, the method according to the embodiment of the invention specifically includes the following two steps:

Step S201: receiving a coded bit stream; and

Step S202, mapping the coded bit stream to space streams.

Preferably, the space streams may employ the same modulation order or different modulation orders.

Preferably, the coded bit stream is mapped to the space streams bit by bit.

Preferably, the bits with a coding constraint relation in the coded bit stream are mapped to the space streams.

Step S202 may be performed in various modes. Preferably, in an optional mode, coded bits with a coding constraint relation in the coded bit stream are sequentially allocated bit by bit to the space streams.

The so-called coded bit stream refers to a data bit stream subjected to channel coding. Wherein, one of the channel coding modes is convolutional coding. Or, one of the channel coding modes is LDPC code coding.

During the allocation, the variations of the modulation orders of each stream need to be considered, and bits with a coding constraint relation are distributed to space streams as possible.

Preferably, Step S202 specifically includes the following steps:

it is assumed that an input sequence of the inputted coded bit stream is $\tilde{c}_k$, and the output sequence is $q_l^{si} = \tilde{c}_{f^{si}(l)}$; where, k is an index order of the input sequence $\tilde{c}_k$ of the coded bit stream input before stream mapping, $$k \in \left[ 0, 1, 2, \ldots, N_{sympss} \sum_{si=0}^{N_{ss}-1} N_{cbpss}(si) - 1 \right];$$

l is a bit index of an outputted stream $q_l^{si}$ after the stream mapping of the sith space stream. The lth bit of the sith space stream corresponds to the kth bit of the input sequence $\tilde{c}_k$, where, $N_{cbpss}(si)$ is the number of coded bits carried by each OFDM symbol in the sith space stream, $N_{cbpss} = N_{scpsym} \cdot N_{cbpsc}(si)$.

For the sith space stream, the coded bit stream is mapped to space streams according to the following operation:

$$\Omega^{si} \in I = \left\{ k \mid k \in \left[ 0, 1, 2, \ldots, N_{sympss} \cdot \sum_{si=0}^{N_{ss}-1} N_{cbpss}(si) - 1 \right] \right\};$$

where I is a set of subscripts of the inputted coded streams; and k is an index order of an inputted coded bit stream $\tilde{c}_k$ before stream mapping;

$\Omega^{si}$ is a set of bit indexes k of the original coded bit stream corresponding to bits of the sith space stream after the stream mapping, and elements of $\Omega^{si}$ may be calculated by the following formula:

$$\Omega^{si} = \left\{ k \mid k = f^{si}(l) = \left\lfloor \frac{l}{N_{cbpsc}(si)} \right\rfloor \sum_{n=0}^{N_{ss}-1} N_{cbpsc}(n) + \sum_{i=\left\lfloor \frac{l}{N_{cbpsc}(si)} \right\rfloor \cdot N_{cbpsc}(si)}^{l-1} N_{ss}^{si}(i) + si; \right.$$

where, $l \in \{0, 1, \ldots, N_{sympss} \cdot N_{scpsym} \cdot N_{cbpsc}(si)-1\}$;

$$f^{si}(l) = k = \left\lfloor \frac{l}{N_{cbpsc}(si)} \right\rfloor \sum_{n=0}^{N_{ss}-1} N_{cbpsc}(n) + \sum_{i=\left\lfloor \frac{i}{N_{cbpsc}(si)} \right\rfloor \cdot N_{cbpsc}(si)}^{l-1} N_{ss}^{si}(i) + si =$$

$$\left\lfloor \frac{l}{N_{cbpsc}(si)} \right\rfloor \sum_{n=0}^{N_{ss}-1} N_{cbpc}(n) + \sum_{j=0}^{mod(l, N_{cbpsc}(si))-1} N_{ss}^{base}(j) + si;$$

si is a space stream index; k is an index order of an input sequence $\tilde{c}_k$ of the inputted coded bit stream before stream mapping; $N_{ss}$ is the number of parallel space streams; $N_{ss}^{si}(i)$ represents the number of parallel space streams when the ith bit is transmitted from the sith space stream; $N_{cbpss}(si)$ is the number of coded bits carried by each OFDM symbol in the sith space stream; $N_{cbpss}(si)=N_{scpsym} \cdot N_{cbpsc}(si)$; $N_{cbpsc}(si)$ is the number of coded bits carried by each subcarrier of each OFDM symbol in the sith space stream; $N_{scpsym}$ represents the number of subcarriers of each OFDM symbol; and $N_{sympss}$ is the number of OFDM symbols of each space stream.

Preferably, the algorithm of calculating $N_{ss}^{si}(i)$ is the same as that of calculating $N_{ss}^{si}(i)$ in the first embodiment, and reference may be made to the first embodiment, thus it will not be described again here.

Illustration of a specific embodiment is given below.

In the case of 4 space streams, $N_{ss}=4$, for example, Len_cb(si)=6 if si=0, that is, if si=0, the bit length that may be allocated to the sith space stream is 6, $N_{cbpsc}(0)=6$; Len_cb(si)=4 if si=1, that is, if si=1, the bit length that may be allocated to the sith space stream is 4, $N_{cbpsc}(1)=4$; Len_cb(si)=2 if si=2, that is, if si=2, the bit length that may be allocated to the sith space stream is 2, $N_{cbpsc}(2)=2$; and Len_cb(si)=2 if si=3, that is, if si=3, the bit length that may be allocated to the sith space stream is 2, $N_{cbpsc}(3)=2$. Thus, $S=\{6, 4, 2, 2\}$.

Here, $N_{ss}^{base}(j)$ is calculated by taking the first allocation period as an example, and $$|S| = \sum_{i=0}^{N_{ss}-1} N_{cbpsc}(si) = 14$$

bits are allocated bit stream by bit stream. This process is divided into a plurality of allocation stages, and the number of parallel space streams in each allocation stage is different from that in any other allocation stage.

Preferably, first of all, an allocation stage number P is calculated in a method as follows:

$A = \text{unique}(S) = \{6,4,2\}$;

$B = \text{sort}(A) = \{2,4,6\}$;

the allocation stage number P=length(B)=3;
the bit occurrence of the first allocation stage C(0)=B(0);
the bit occurrence of the second allocation stage C(1)=B(1)−B(0); and
the bit occurrence of the third allocation stage C(2)=B(2)−B(1).

First of all, the allocation stage number P is calculated as 3, B(0)=2, B(1)=4 and B(2)=6, according to the above formula. The bit occurrences of the allocation stages are C(0)=2, C(1)=2 and C(2)=2, respectively. Then, the number of parallel space streams of each bit is calculated by, first of all, determining the Pth allocation stage for an inputted bit according to the sequence number j of the inputted bit, and then calculating the number of parallel space streams of different stages and the bit range of each stage, specifically as follows:

The number of parallel space streams of the 0th stage is:

$M_{ss}^{base}(p) = \text{sum}(S \geq B(p)) = \text{sum}([6,4,2,2] \geq 2) = \text{sum}([1,1,1,1]) = 4, p=0$, and the bit range of the 0th stage is [0, K(0)], where K(0)=C(0)−1=2−1=1;
the number of parallel space streams of the 1st stage is:

$M_{ss}^{base}(1) = \text{sum}(S \geq B(1)) = \text{sum}([6,4,2,2] \geq 4) = \text{sum}([1,1]) = 2$;

and the bit range of the 1st stage is [K(0)+1, K(1)], where K(1)=K(0)+C(1)=1+2=3; and
the number of parallel space streams of the 2nd stage is:

$M_{ss}^{base}(2) = \text{sum}(S \geq B(2)) = \text{sum}([6,4,2,2] \geq 6) = \text{sum}([1]) = 1$;

and the bit range of the 2nd stage is [K(1)+1, K(2)], where K(2)=K(1)+C(2)=3+2=5.

Then, the number of parallel space streams $N_{ss}^{base}(j)$ of the jth bit in the first allocation period is calculated according to a formula $N_{ss}^{base}(j) = M_{ss}^{base}(g(j))$:

$N_{ss}^{base}(0) = M_{ss}^{base}(g(0))=4, j=0, g(0)=0$;

$N_{ss}^{base}(1) = M_{ss}^{base}(g(1))=4, j=1, g(1)=0$;

$N_{ss}^{base}(2) = M_{ss}^{base}(g(2))=2, j=2, g(2)=1$;

$N_{ss}^{base}(3) = M_{ss}^{base}(g(3))=2, j=3, g(3)=1$;

$N_{ss}^{base}(4) = M_{ss}^{base}(g(4))=1, j=4, g(4)=2$; and $N_{ss}^{base}(5) = M_{ss}^{base}(g(5))=1, j=5, g(5)=2$.

Then, $N_{ss}^{si}(i)$ is obtained according to a formula $N_{ss}^{si}(i) = N_{ss}^{base}(i \mod N_{cbpsc}(si))$ as follows.

If si=0, $N_{ss}^0(i) = [4\,4\,2\,2\,1\,1, 4\,4\,2\,2\,1\,1, \ldots, 4\,4\,2\,2\,1\,1]$.

(4 4 2 2 1 1 is directed to one allocation period, and 4 4 2 2 1 1, 4 4 2 2 1 1, …, 4 4 2 2 1 1 are multiple occurrences of the result for one allocation period)

If si=1, $N_{ss}^1(i) = [4\,4\,2\,2, 4\,4\,2\,2, \ldots, 4\,4\,2\,2]$.

If si=2, $N_{ss}^2(i) = [4\,4,4\,4, \ldots, 4\,4]$.

If si=3, $N_{ss}^3(i) = [4\,4,4\,4, \ldots, 4\,4]$.

Preferably, l may be mapped to a subscript k according to a formula $$f^{si}(l) = k = \left\lfloor \frac{l}{N_{cbpsc}(si)} \right\rfloor \sum_{n=0}^{N_{ss}-1} N_{cbpsc}(n) + \sum_{i=\left\lfloor \frac{i}{N_{cbpsc}(s)} \right\rfloor \cdot N_{cbpsc}(si)}^{l-1} N_{ss}^{si}(i) + si =$$

$$\left\lfloor \frac{l}{N_{cbpsc}(si)} \right\rfloor \sum_{n=0}^{N_{ss}-1} N_{cbpsc}(n) + \sum_{j=0}^{mod(l, N_{cbpsc}(si))-1} N_{ss}^{base}(j) + si,$$

and the following result may be obtained:
when l=0, in the case of 4 streams, $q_0^0$, $q_0^1$, $q_0^2$, $g_0^3$ correspond to c0, c1, c2, c3, respectively;

$$f^{si=0}(0) = k = \left\lfloor \frac{0}{6} \right\rfloor \cdot 14 + \sum_{i=0}^{mod(0,6)-1} N_{ss}^{base}(j) + 0 = \sum_{i=0}^{-1} N_{ss}^{base}(j) = 0$$

$$f^{si=1}(0) = k = \left\lfloor \frac{0}{4} \right\rfloor \cdot 14 + \sum_{i=0}^{mod(0,4)-1} N_{ss}^{base}(j) + 1 = \sum_{i=0}^{-1} N_{ss}^{base}(j) + 1 = 1$$

$$f^{si=2}(0) = k = \left\lfloor \frac{0}{2} \right\rfloor \cdot 14 + \sum_{i=0}^{mod(0,2)-1} N_{ss}^{base}(j) + 2 = \sum_{i=0}^{-1} N_{ss}^{base}(j) + 2 = 2$$

$$f^{si=3}(0) = k = \left\lfloor \frac{0}{2} \right\rfloor \cdot 14 + \sum_{i=0}^{mod(0,3)-1} N_{ss}^{base}(j) + 3 = \sum_{i=0}^{-1} N_{ss}^{base}(j) + 3 = 3$$

when l=1, $N_{ss}(0)=N_{ss}^{base}(0)=4$, in the case of 4 streams, $q_1^0, q_1^1, q_1^2, q_1^3$ correspond to c4, c5, c6, c7, respectively;

$$f^{si=0}(1) = k = \left\lfloor \frac{1}{6} \right\rfloor \cdot 14 + \sum_{i=0}^{mod(1,6)-1} N_{ss}^{base}(j) + 0 = \sum_{i=0}^{0} N_{ss}^{base}(j) = 4$$

$$f^{si=1}(1) =$$
$$k = \left\lfloor \frac{1}{4} \right\rfloor \cdot 14 + \sum_{i=0}^{mod(1,4)-1} N_{ss}^{base}(j) + 1 = \sum_{i=0}^{0} N_{ss}^{base}(j) + 1 = 4 + 1 = 5$$

$$f^{si=2}(1) =$$
$$k = \left\lfloor \frac{1}{2} \right\rfloor \cdot 14 + \sum_{i=0}^{mod(1,2)-1} N_{ss}^{base}(j) + 2 = \sum_{i=0}^{0} N_{ss}^{base}(j) + 2 = 4 + 2 = 6$$

$$f^{si=3}(1) =$$
$$k = \left\lfloor \frac{1}{2} \right\rfloor \cdot 14 + \sum_{i=0}^{mod(1,2)-1} N_{ss}^{base}(j) + 3 = \sum_{i=0}^{0} N_{ss}^{base}(j) + 3 = 4 + 3 = 7$$

when l=2, $N_{ss}(0)=N_{ss}^{base}(0)=4, N_{ss}(1)=N_{ss}^{base}(1)=4$, in the case of 4 streams, $q_2^0, q_2^1, q_2^2, q_2^3$ correspond to c8, c9, c16, c17, respectively;

$$f^{si=0}(2) = k = \left\lfloor \frac{2}{6} \right\rfloor \cdot 14 + \sum_{i=0}^{mod(2,6)-1} N_{ss}^{base}(j) + 0 = \sum_{i=0}^{1} N_{ss}^{base}(j) = 4 + 4 = 8$$

$$f^{si=1}(2) =$$
$$k = \left\lfloor \frac{2}{4} \right\rfloor \cdot 14 + \sum_{i=0}^{mod(2,4)-1} N_{ss}^{base}(j) + 1 = \sum_{i=0}^{1} N_{ss}^{base}(j) + 1 = 4 + 4 + 1 = 9$$

$$f^{si=2}(2) = k = \left\lfloor \frac{2}{2} \right\rfloor \cdot 14 + \sum_{i=0}^{mod(2,2)-1} N_{ss}^{base}(j) + 2 =$$
$$14 + \sum_{i=0}^{-1} N_{ss}^{base}(j) + 2 = 14 + 2 = 16$$

$$f^{si=3}(2) = k = \left\lfloor \frac{2}{2} \right\rfloor \cdot 14 + \sum_{i=0}^{mod(2,2)-1} N_{ss}^{base}(j) + 3 =$$
$$14 + \sum_{i=0}^{-1} N_{ss}^{base}(j) + 3 = 14 + 3 = 17$$

when l=3, $N_{ss}(0)=N_{ss}^{base}(0)=4$, $N_{ss}(2)=N_{ss}^{base}(2)=2$ and $N_{ss}(1)=N_{ss}^{base}(1)=4$, in the case of 4 streams, $q_3^0, q_3^1, q_3^2, q_3^3$ correspond to c10, c11, c20, c21, respectively;

when l=4, in the case of 4 streams, $q_4^0, q_4^1, q_4^2, q_4^3$ correspond to c12, c15, c30, c31 respectively;

when l=5, in the case of 4 streams, $q_5^0, q_5^1, q_5^2, q_5^3$ correspond to c13, c19, c34, c35, respectively;

when l=6, in the case of 4 streams, $q_6^0, q_6^1, q_6^2, q_6^3$ correspond to c14, c23, c44, c45, respectively;

$$f^{si=0}(6) = k = \left\lfloor \frac{6}{6} \right\rfloor \cdot 14 + \sum_{i=0}^{mod(6,6)-1} N_{ss}^{base}(j) + 0 = 14 + \sum_{i=0}^{-1} N_{ss}^{base}(j) = 14$$

$$f^{si=1}(6) = k = \left\lfloor \frac{6}{4} \right\rfloor \cdot 14 + \sum_{i=0}^{mod(6,4)-1} N_{ss}^{base}(j) + 1 =$$
$$14 + \sum_{i=0}^{1} N_{ss}^{base}(j) + 1 = 14 + 8 + 1 = 23$$

$$f^{si=2}(6) = k = \left\lfloor \frac{6}{2} \right\rfloor \cdot 14 + \sum_{i=0}^{mod(6,2)-1} N_{ss}^{base}(j) + 2 =$$
$$42 + \sum_{i=0}^{-1} N_{ss}^{base}(j) + 2 = 42 + 2 = 44$$

$$f^{si=3}(6) = k = \left\lfloor \frac{6}{2} \right\rfloor \cdot 14 + \sum_{i=0}^{mod(6,2)-1} N_{ss}^{base}(j) + 3 =$$
$$42 + \sum_{i=0}^{-1} N_{ss}^{base}(j) + 3 = 42 + 3 = 45$$

and so on.

The result after the mapping is the same as that of FIG. 4 in the first embodiment, and reference may be made to FIG. 4.

As can be seen, for the purpose of mapping multiple bits with a coding constraint relation to space streams, the multiple bits are preferably allocated one by one in sequence to bit allocatable space streams. The number N of bits that may be allocated to each space stream is related to the modulation order M of the space stream, that is, $N=\log_2 M$. When the modulation mode of a space stream is 64QAM, the number of bits that may be allocated to the space stream is 6, that is, 6 bits may be allocated to the space stream; when the modulation mode of a space stream is 16 QAM, the number of bits that may be allocated to the space stream is 4, that is, 4 bits may be allocated to the space stream; and likewise, when the modulation mode of a space stream is QPSK, the number of bits that may be allocated to the space stream is 2, that is, 2 bits may be allocated to the space stream. Because the modulation orders of the multiple space streams are not identical, the numbers of bits that may be allocated to the space streams may be not necessarily consistent with each other. For example, in the embodiments shown in FIGS. 3 and 4, the modulation orders of 4 space streams are not identical, which causes that the numbers of bits that may be allocated to the space streams are not necessarily the same. Thus, when multiple bits with a coding constraint relation are sequentially allocated one by one to the space streams, a situation, where sufficient bits have been allocated to some space streams but a bit may be further allocated to another space stream, would occur.

The so called bit allocatable space stream refers to a space stream to which a bit may be further allocated; and the so called bit non-allocatable space stream refers to a space stream to which enough bits have been allocated.

As can be seen, during the sequential one-by-one allocation of bits to the bit allocatable space streams, all space streams in the initial stage are bit allocatable space streams. As bits are continuously allocated to the space streams bit by bit (i.e., one bit after another), a space stream with low-order modulation will be allocated with sufficient bits earlier than a space stream with high-order modulation, and turns into a bit non-allocatable space stream. When a certain space stream becomes a bit non-allocatable space stream, it will not be allocated with further bits. Thus, during the bit allocation, the bit non-allocatable space stream will be ignored, and bits will only be allocated sequentially one by one to those bit allocatable space streams, until all bits with a coding constraint relation are allocated.

After the allocation of a group of bits with a coding constraint relation is finished, at the beginning of allocating the next group of bits with a coding constraint relation, all space streams are turned into bit allocatable space streams, and the process in which bits are sequentially allocated one by one to bit allocatable space streams is repeated.

A Third Embodiment

The third embodiment provide a method for data transmission in a wireless system, where space bit streams are obtained by performing a bit-by-bit stream mapping operation on an inputted bit stream, so that coded bits with a coding constraint relation in the coded bit stream are mapped to space streams via a stream mapping apparatus.

Figure 7:
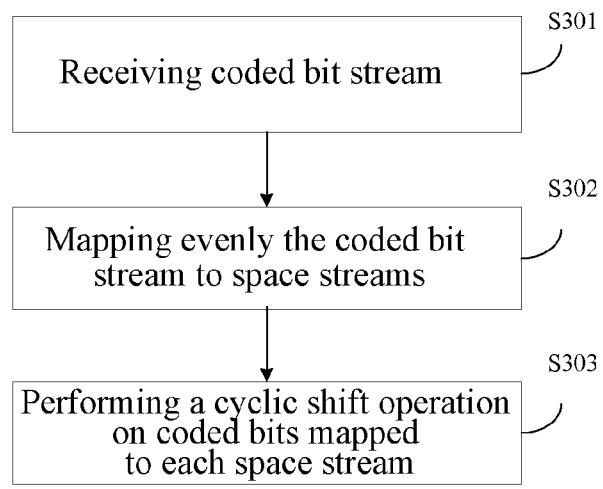
FIG. 7 is an exemplary flow chart of another method for data transmission according to a third embodiment of the invention.

As shown in FIG. 7, the stream mapping operation specifically includes the following two steps:

Step S301: receiving a coded bit stream; and

Step S302: mapping the coded bit stream to space streams.

The specific implementation is obvious by referring to the detailed description of the first and second embodiments, and is basically the same as that in the first and second embodiments, and thus will not be described again here.

Step S303: performing a cyclic shift operation on bit streams mapped to each space stream.

Preferably, a bit stream $q_i$ mapped to each space stream is subjected to the following cyclic shift operation:

$$r = [l + si \cdot N_{cbpcs}(si) \cdot N_{shift}] \bmod [N_{scpsym} \cdot N_{cbpsc}(si)];$$

after the cyclic shift, a bit sequence $q_r^{si}$ is output from each space stream to a bit interleaving apparatus.

Where, $N_{shift}$ is a cyclic delay factor which is an adjustable parameter; preferably, $N_{shift}=37$, and at this point, $r=[l+si \cdot N_{cbpsc}(si) \cdot 37] \bmod [N_{scpsym} \cdot N_{cbpsc}(si)]$, and r may represent a bit index order outputted after a space cyclic delay.

The main object of the cyclic shift is to solve the problem of space selective block fading caused by antenna correlation.

The simulation in the MIMO environment shows that, in the case of an open loop, high-order modulation and multiple streams, the method for data transmission according to the Third embodiment of the invention, i.e., a method including cyclic shift after the stream mapping, a large gain may be obtained in comparison with the IEEE 802.11n algorithm. With the embodiment of the invention, the system performance of a wireless communication system can be further improved.

A Fourth Embodiment

The fourth embodiment of the invention provides a method for data transmission, which includes the following steps.

Step S401, a coded bit stream received is mapped to space streams.

The specific implementation of Step S401 is the same as that of the first and second embodiment, and thus will not be described again here. Reference may be made to the first and second embodiments for the detailed description.

Preferably, after this step, the method further includes: performing a cyclic shift operation on a space bit stream mapped to each space stream, to obtain a bit stream after cyclic shift. The specific implementation is the same as that of the third embodiment and will not be described again here, and reference may be made to the third embodiment for the detailed description.

Step S402, a single-stream 2-dimensional interleaving operation is performed on the space bit stream outputted in Step S401.

Preferably, in this step, the purpose of the interleaving operation performed on the space bit stream is to further improve the system performance via interleaving, to counteract selective fading in the frequency domain and avoid an overlong constellation LSB bits. The definition of interleaving parameters of this operation includes $N_{col}$ and row number $N_{row}=(N_{cbpsc}(si)/N_{col})$. The parameters for the interleaving algorithm may be adjusted.

For a bit stream, the following bit interleaving processing may be employed.

If the channel coding is based on LDPC code, the bit interleaving processing is unnecessary; and if the channel coding is based on convolutional code, the following bit interleaving processing may be employed. The interleaving depth of each space stream is: $N_{cbpsym}(si)=N_{cbpsc}(si) \cdot N_{scpsym}$.

The following two substitution processes are employed, where k indicates a bit index of an inputted data stream after cyclic delay shift (i.e., indicating that the bit stream is entered to an interleaving module in the order k), and i and j indicate bit index orders of the outputs after the first and the second substitutions, respectively.

Preferably, $N_{col}=16$, and for the first substitution:

$$i = (N_{cbpsym}(si)/16) \cdot \bmod(k,16) + \lfloor k/16 \rfloor\ i,k=0,1,\ldots N_{cbpsym}-1;$$

for the second substitution:

$$j = \tilde{Q}(si) \times \lfloor i/\tilde{Q}(si) \rfloor + \bmod \{[i+N_{cbpsym}(si) - \lfloor 16 \times i/N_{cbpsym}(si) \rfloor], \tilde{Q}(si)\};$$

where, $N_{cbpsym}(si)$ is an interleaving depth, $N_{cbpsym}(si)=N_{cbpsc}(si) \cdot N_{scpsym}$; $N_{cbpsc}(si)$ is the number of coded bits carried by each subcarrier in the space stream; and $N_{scpsym}$ is the number of data subcarriers of each OFDM symbol;

$$\tilde{Q}(si) = \max\left(\frac{N_{cbpsym}(si)}{2}, 1\right);$$

$N_{col}$ is the column number of an interleaving unit; i is a bit index of a bit stream outputted after the first substitution; j is a bit index of a bit stream outputted after the second substitution; and k is a bit index of an inputted bit stream.

With the above interleaving processing, the outputted bit sequence of each stream is $[\tilde{q}_0^{si}\ \tilde{q}_1^{si}\ \ldots\ \tilde{q}_{Len\_cw(si)-1}^{si}]$.

The above interleaving process is accomplished by a transmitter, while the de-interleaving process is accomplished be a receiver.

The de-interleaving process is as follows:

for the first substitution:

$$i = \tilde{Q}(si) \times \lfloor j/\tilde{Q}(si) \rfloor + \bmod \{[j + \lfloor 16 \times j/N_{cbpsym}(si) \rfloor], \tilde{Q}(si)\},$$

where, $j=0, 1, \ldots N_{cbpsym}-1;$ for the second substitution:

$$k = 16 \cdot i - (N_{cbpsym}(si)-1) \times \lfloor 16 \times i/N_{cbpsym}(si) \rfloor.$$

A Fifth Embodiment

The fifth embodiment of the invention provides another method for data transmission, which includes the following steps.

Step S501, scrambling, channel coding and rate matching is performed on an inputted bit stream. A detailed description will be given below on the scrambling, channel coding and rate matching, respectively.

(1) Scrambling

In this step, the object of scrambling is to randomize data bits, to facilitate carrier extraction and clock recovery, reduce the occurrence of continuous 0s and continuous 1s, and reduce the peak-to-mean ratio of the system. The scrambling process is described as follows.

Figure 8:
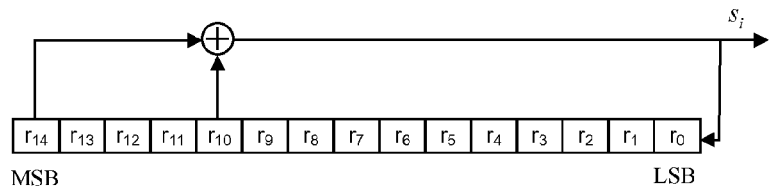
FIG. 8 is a schematic diagram showing the generation of a scrambling sequence according to a fifth embodiment of the invention.

A data bit sequence $[b_0 b_1 \ldots b_{Len\_bit-1}]$ is scrambled by a scrambling sequence, which is a binary sequence $[s_0 s_1 \ldots s_{Len\_bit-1}]$ outputted by a maximum length linear feedback shift register with a generator polynomial $1+X^{11}+X^{15}$. Each code block in the system is scrambled and reset once. The block diagram for generating a scrambling sequence is shown in FIG. 8.

For a downlink system information channel, the initial value of the register is $r_{init}=[101010001110110]_b$, in which the MSB is on the left, and the LSB is on the right; for other uplink and downlink control channels and service channels, the initial value of the register is $r_{init}=[0101011\ N_{ID}^{AP}]$, where $N_{ID}^{AP}$ represents the least significant 7 bits of a MAC address of a CAP, which are broadcast in a system information channel.

An outputted scrambled bit sequence $[\tilde{b}_0 \tilde{b}_1 \ldots \tilde{b}_{Len\_bit-1}]$ may be obtained by an Exclusive-OR operation on the data bit sequence and the scrambling sequence according to the following formula bit by bit.

$$\tilde{b}=(b_i+s_i) \bmod 2 \quad i=0,1,\ldots \text{Len\_bit}-1$$

(2) Channel Coding

A channel coding module applies Forward Error Correction (FEC) protection on the outputted scrambled data bit sequence $[\tilde{b}_0 \tilde{b}_1 \ldots \tilde{b}_{Len\_bit-1}]$. Herr, two types of FEC codes, i.e. convolutional coding and LDPC coding, are supported.

1) Convolutional Coding

Here, the structure of the convolutional code is [133 171]. The output of convolutional coding is $[c_0 c_1 \ldots c_{Len\_cw-1}]$.

$$\text{Len\_cw}=2\times(\text{Len\_bit}+6)$$

where, $$c_{2l} = c_l^0$$
$$c_{2l+1} = c_l^1 \quad l=0, 1, \ldots \text{Len\_cw}/2$$

Figure 9:
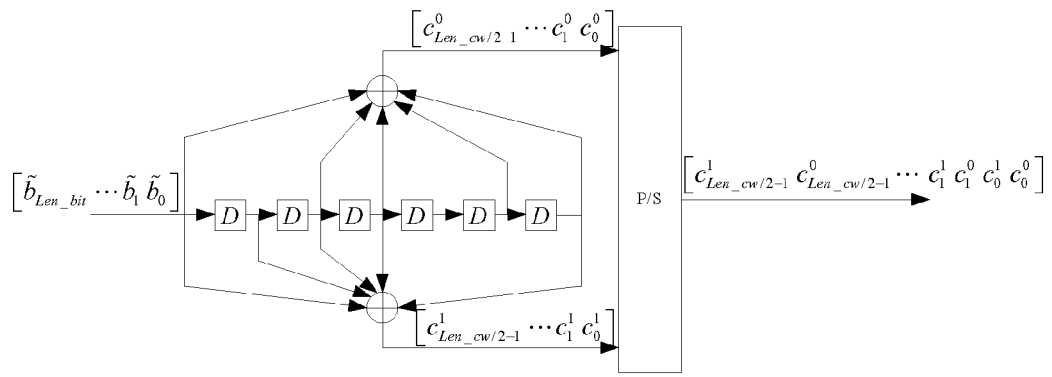
FIG. 9 is a schematic diagram showing the structure of a convolutional coding means according to the fifth embodiment of the invention.

Here, return-to-zero convolutional coding is employed, and 6 zero bits need to be appended to the end of the bit sequence $[\tilde{b}_0 \tilde{b}_1 \ldots \tilde{b}_{Len\_bit-1}]$. The structure of a convolutional coding means is shown in FIG. 9.

2) LDPC Coding

LDPC code check matrix and generation matrix

An LDPC code is employed in high-performance error correction coding, the check matrix H of which may be represented in the following form:

$$H = \begin{bmatrix} A_{0,0} & A_{0,1} & \ldots & A_{0,c-1} \\ A_{1,0} & A_{1,1} & \ldots & A_{1,c-1} \\ \vdots & \vdots & \ddots & \vdots \\ A_{\rho-1,0} & A_{\rho-1,1} & \ldots & A_{\rho-1,c-1} \end{bmatrix}$$

wherein, $A_{i,j}$ is a t×t cyclic matrix with a row weight of 0 or 1, and each row of the matrix is obtained by cyclic shift of the preceding row to the right by one bit, and the first row is obtained by cyclic shift of the last row to the right by one bit. A code word characterized by the matrix H is referred to as (N, K) LDPC code, where N=c×t is a code length, and K=(c−ρ)×t represents the length of coded information bits, of which the code rate is R=K/N. The first row of $A_i=[A_{i,0}, A_{i,1} \ldots, A_{i,e-1}]$, i=0, 1, . . . , ρ−1 is referred to as the (i+1)th row generator of the matrix H, thus the matrix H includes totally ρ row generators.

The generation matrix G corresponding to the check matrix H may be represented as:

$$G=[I|P],$$

where, I is a unit matrix, and matrix P may be represented as:

$$P = \begin{bmatrix} P_{0,0} & P_{0,1} & \ldots & P_{0,\rho-1} \\ P_{1,0} & P_{1,1} & \ldots & P_{1,\rho-1} \\ \vdots & \vdots & \ddots & \vdots \\ P_{c-\rho-1,0} & P_{c-\rho-1,1} & \ldots & P_{c-\rho-1,\rho-1} \end{bmatrix}$$

where, $P_{i,j}$ is a t×t cyclic matrix, of which each column is obtained by the cyclic shift of the preceding column downwards by one bit, and the first column is obtained by the cyclic shift of the last column downwards by one bit. The first column of the matrix $P_j=[P_{0,j}, P_{1,j}, \ldots P_{c-\rho-1,j}]^T$, j=0, 1, . . . , ρ−1 is referred to as the (j+1)th column generator of the generation matrix G, thus G totally includes ρ column generators.

LDPC Coding

The LDPC code coding process may be represented by: x=u·G;

where, $u=(u_0, u_1, L, u_{K-1})$ represents K coded information bits, $x=(u_0, u_1, L, u_{K-1}, v_0, v_1, L, v_{N-K-1})$ represents a code word with a length of N, $v=(v_1, L, v_{N-K-1})$ represents N−K check bits, and the coded code word meets a check equation $H \cdot x^T=0$.

(3) Rate Matching

After the coding, different code rates are obtained by means of puncturing, which is referred to as a rate matching process.

Preferably, if the channel coding is based on a convolutional code, the output code rate of the coder is ½, and code rates of ⅝, ⅔, ¾, ⅚ and ⅞ may be obtained via puncturing.

Preferably, the puncturing of the code rate ⅝ is important for the invention. After the coding is completed, there are two solutions of puncturing of the code rate ⅝, as shown by the puncturing patterns in FIGS. 10 and 11.

Figure 10:
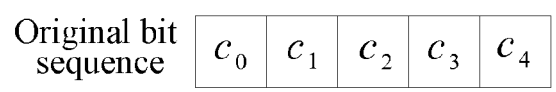
FIG. 10 is a schematic diagram showing puncturing at a code rate ⅝ according to the fifth embodiment of the invention.
Figure 10:
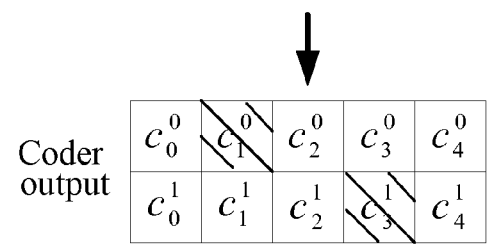
Figure 10:
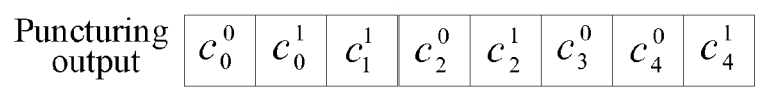

Preferably, in the first solution, convolutional coding is performed on digital data through a convolutional code at the code rate ⅝, and the first solution includes the following steps:

with puncturing of $$\begin{Bmatrix} 10111 \\ 11101 \end{Bmatrix},$$

any location corresponding to an element 0 is deleted, and any location corresponding to an element 1 is reserved; and the convolutional code of a code rate ½ based on an octal generator 133, 171 is shrunk to the code rate ⅝, where a constraint length K=7; and an inputted bit stream is processed using a code of the code rate ⅝, as shown in FIG. 10.

As shown in FIG. 10, gray bits $c_1^0$ and $c_3^1$ represent punctured bits. The original bit sequence corresponds to the code word outputted by a [133 171] convolutional code.

Figure 11:
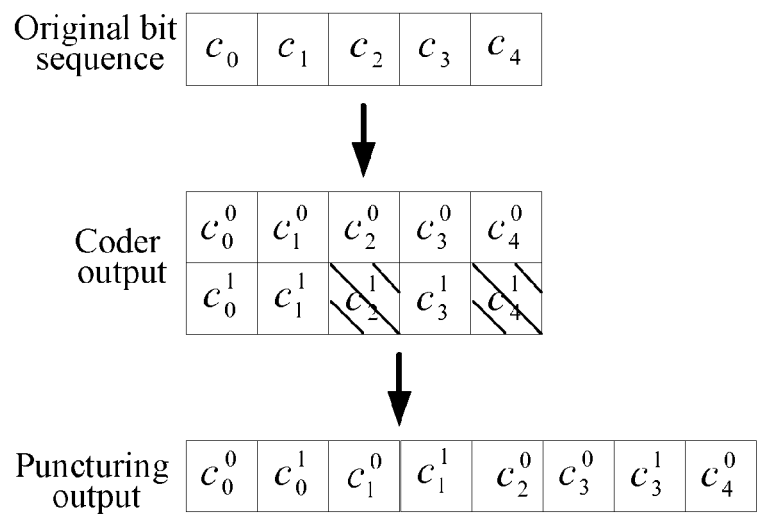
FIG. 11 is a schematic diagram showing another puncturing at a code rate ⅝ according to the fifth embodiment of the invention.

Preferably, in the second solution, convolutional coding is performed on digital data through a convolutional code at the code rate ⅝, and the second solution includes the following steps:

with puncturing of $$\begin{Bmatrix} 11111 \\ 11010 \end{Bmatrix},$$

any location corresponding to an element 0 is deleted, and any location corresponding to an element 1 is reserved; and the convolutional code of a code rate ½ based on an octal generator 133, 171 is shrunk to the code rate ⅝, wherein a constraint length K=7; and an inputted bit stream is processed using a code of the code rate ⅝, as shown in FIG. 11.

As shown in FIG. 11, gray bits $c_2^1$ and $c_4^1$ represent punctured bits. The original bit sequence corresponds to the code word outputted by a [133 171] convolutional code.

If channel coding is based on an LDPC code, the above puncturing process is not needed.

In the case of either EQM modulation or UEQM modulation, the number of OFDM symbols transmitted by different space streams of the same code word is the same. After the puncturing process, a code word $[\tilde{c}_0\ \tilde{c}_1\ \ldots\ \tilde{c}_{Len\_punc-1}]$ is outputted.

$$Len\_punc = N_{sympss} \cdot N_{scpsym} \cdot \sum_{si=0}^{N_{ss}-1} N_{cbpsc}(si)$$

Figure 12:
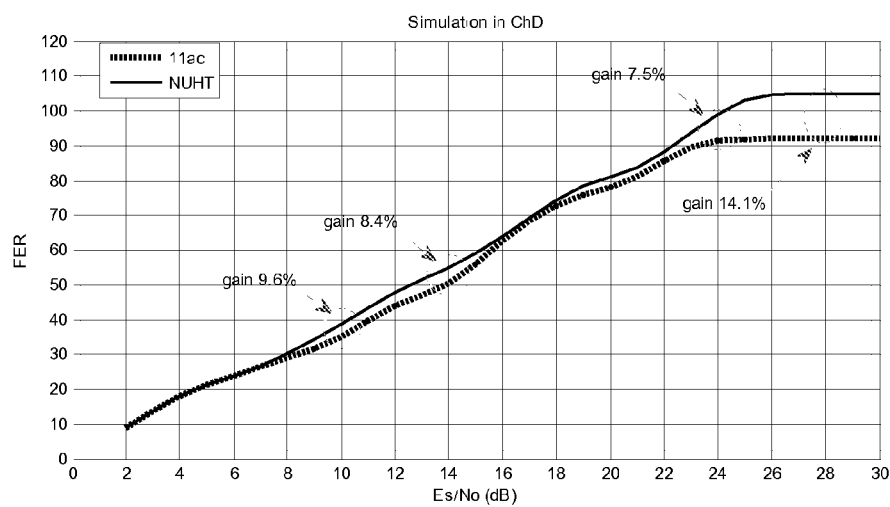
FIG. 12 is a schematic simulation diagram showing a capacity gain obtained through system link adaptation at a medium Signal-to-Noise Ratio after the puncturing at a code rate ⅝ employed in a closed-loop mode according to the fifth embodiment of the invention.

With the new solution of code rate ⅝ in the fifth embodiment of the invention, a capacity gain of 8%-9% may be obtained for IEEE 802.11 system link adaptation at an intermediate Signal-to-Noise Ratio of 10-15 dB, as shown in FIG. 12.

Figure 13:
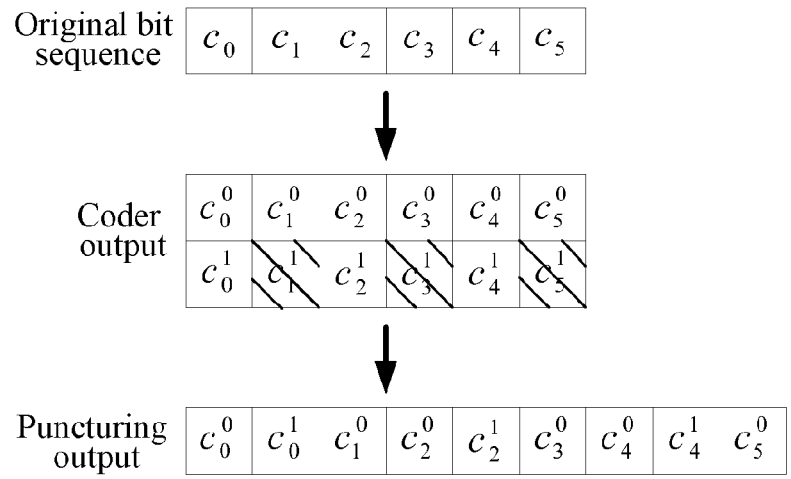
FIG. 13 is a schematic diagram showing puncturing at a code rate ⅔ according to the fifth embodiment of the invention.

FIG. 13 is a schematic diagram showing puncturing at a code rate ⅔.

Figure 14:
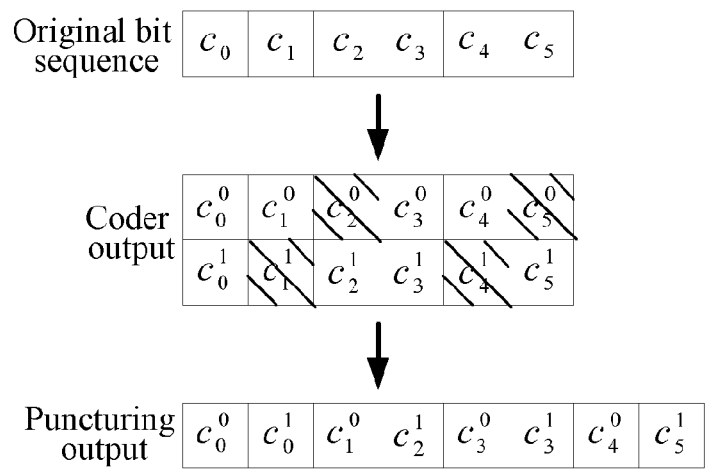
FIG. 14 is a schematic diagram showing puncturing at a code rate ¾ according to the fifth embodiment of the invention.

FIG. 14 is a schematic diagram showing puncturing at a code rate ¾.

Figure 15:
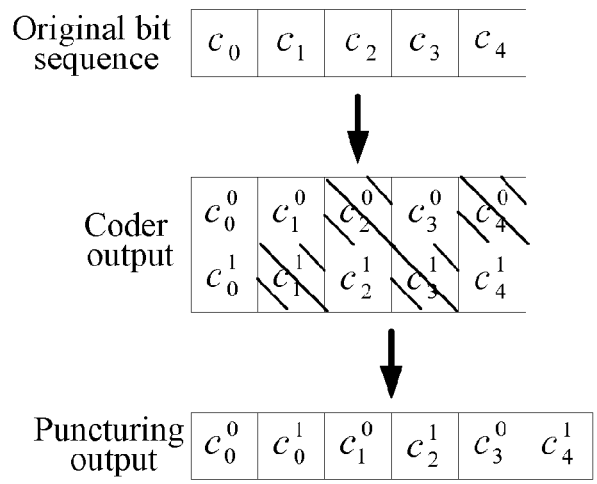
FIG. 15 is a schematic diagram showing puncturing at a code rate ⅚ according to the fifth embodiment of the invention.

FIG. 15 is a schematic diagram showing puncturing at a code rate ⅚.

Figure 16:
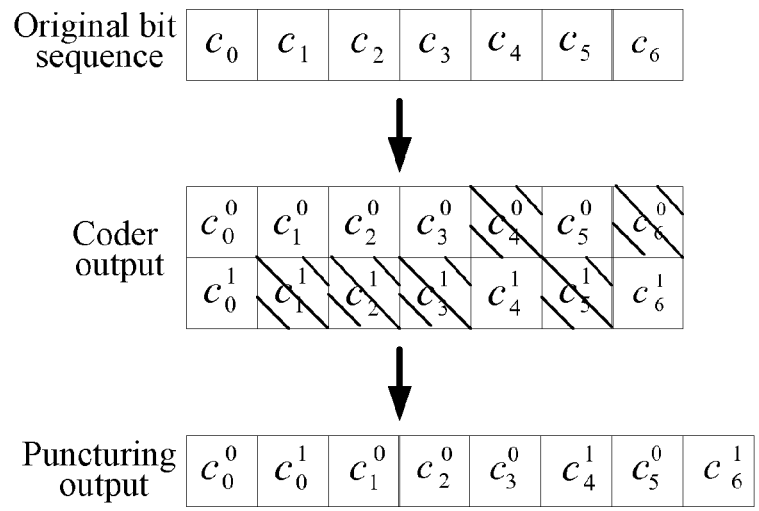
FIG. 16 is a schematic diagram showing puncturing at a code rate ⅞ according to the fifth embodiment of the invention.

FIG. 16 is a schematic diagram showing puncturing at a code rate ⅞.

Step S502, a coded bit stream outputted after the scrambling, channel coding and rate matching in Step S501 is mapped to space streams.

The specific implementation is the same as that of the first, second or third embodiment, and thus will not be described again here. Reference may be made to the first, second or third embodiment for the detailed description.

A Sixth Embodiment

Figure 17:
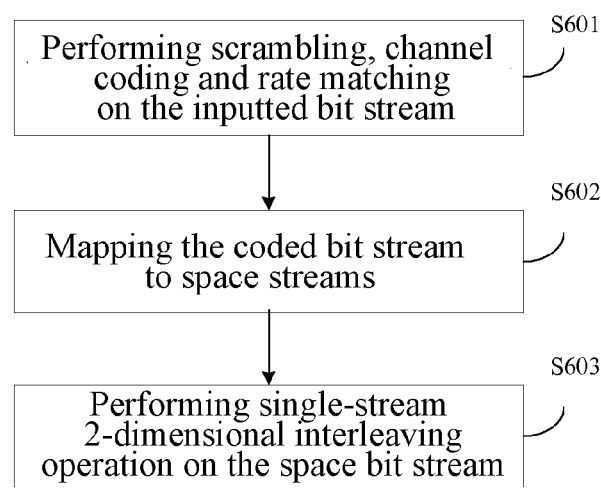
FIG. 17 is a schematic flow chart of a method for data transmission according to a sixth embodiment of the invention.

The sixth embodiment of the invention provides another method for data transmission, as shown in FIG. 17, which includes the following steps:

Step S601, scrambling, channel coding and rate matching is performed on an inputted bit stream.

The specific implementation is the same as that of the fourth embodiment, and thus will not be described again here. Reference may be made to the fourth embodiment for the detailed description.

Step S602, a coded bit stream outputted after the scrambling, channel coding and rate matching in Step S601 is mapped to space streams.

The specific implementation is the same as that of the first, second or third embodiment, and thus will not be described again here. Reference may be made to the first, second or third embodiment for the detailed description.

Step S60, a single-stream 2-dimensional interleaving operation is performed on the space bit stream obtained and output in Step S602.

The specific implementation is the same as that of the fourth embodiment, and thus will not be described again here. Reference may be made to the fourth embodiment for the detailed description.

A Seventh Embodiment

Figure 18:
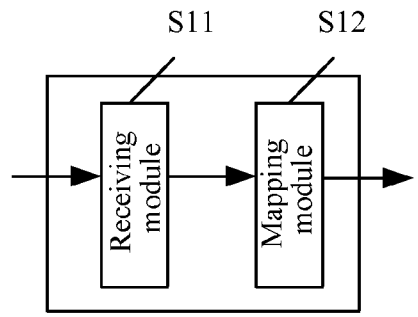
FIG. 18 is a structural representation of an apparatus for realizing stream mapping according to the sixth embodiment of the invention.

FIG. 18 shows the seventh embodiment of the invention which provides an apparatus for stream mapping, and the apparatus may be used for bit-by-bit stream mapping for a UEQM mode or an EQM mode, and specifically includes:

a receiving module S11, configured for receiving a coded bit stream; and a mapping module S12, configured for mapping the coded bit stream to space streams.

The operating principle and the related operation flow of the apparatus for stream mapping according to the seventh embodiment of the invention are basically the same as those in the above embodiments of the data transmission method for realizing stream mapping, and reference may be made to the first to sixth embodiments for its detailed description and the specific realization, which will not be described again here.

An eighth Embodiment

Figure 19:
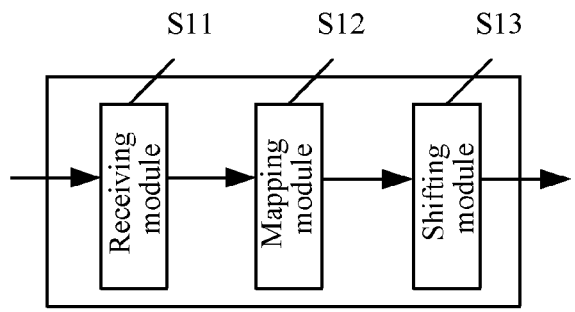
FIG. 19 is a structural representation of another apparatus for realizing stream mapping according to an eighth embodiment of the invention.

FIG. 19 shows the eighth embodiment of the invention which further provides an apparatus for realizing stream mapping, and the apparatus may be used for bit-by-bit stream mapping for a UEQM mode or an EQM mode, and specifically includes:

a receiving module S21, configured for receiving a coded bit stream;

a mapping module S22, configured for mapping the coded bit stream to space streams; and a cyclic shift module S23, configured for performing a cyclic shift operation on space bits mapped to each space stream.

The operating principle and the related operation flow of the apparatus for stream mapping according to the eighth embodiment of the invention are basically the same as those in the above embodiments of the data transmission method for realizing stream mapping, and reference may be made to the first to sixth embodiments for its detailed description and the specific realization, which will not be described again here.

A Ninth Embodiment

Figure 20:
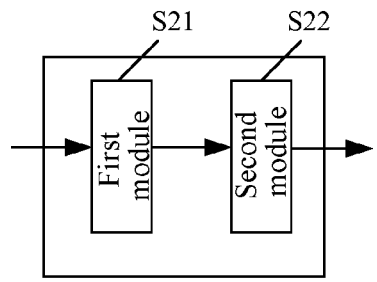
FIG. 20 is a structural representation of an apparatus for realizing rate matching according to a ninth embodiment of the invention.

The ninth embodiment of the invention further provides an apparatus for realizing rate matching, as shown in FIG. 20, which includes:

a first module S41, configured for receiving a convolutional code; and a second module S42, configured for transforming a convolutional code of a code rate ½ to be of a code rate ⅝ through puncturing.

Preferably, the second module S42 is configured for transforming the convolutional code of a code rate ½ based on an octal generator 133, 171 to be of a code rate ⅝ through puncturing.

Preferably, the puncturing is implemented by deleting any location corresponding to an element 0 and reserving any location corresponding to an element 1 according to $$\left\{\begin{matrix}10111\\11101\end{matrix}\right\}.$$

Preferably, the puncturing is implemented by deleting any location corresponding to an element 0 and reserving any location corresponding to an element 1 according to $$\left\{\begin{matrix}11111\\11010\end{matrix}\right\}.$$

A Tenth Embodiment

Figure 21:
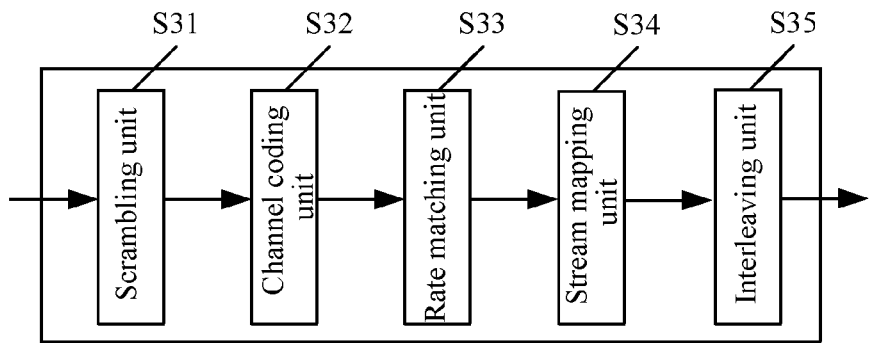
FIG. 21 is a structural representation of a transmitter according to a tenth embodiment of the invention.

The tenth embodiment of the invention further provides a transmitter, as shown in FIG. 21, including:

a scrambling unit S31, configured for scrambling an inputted data bit stream;

a channel coding unit S32, configured for coding the scrambled data bit stream;

a rate matching unit S33, configured for performing rate matching on the coded bit stream;

a stream mapping unit S34, configured for mapping the coded bit stream subjected to the rate matching to space streams; and an interleaving unit S35, configured for performing a bit interleaving operation on each space stream, respectively.

Preferably, the stream mapping unit S34 is further configured for performing a cyclic shift operation on the bit stream mapped to each space stream.

Reference may be made to the seventh and eighth embodiments for the specific realization of the stream mapping unit S34.

Preferably, the channel coding unit S32 is adapted to perform convolutional coding on the inputted bit stream.

Preferably, the channel coding unit S32 is further adapted to perform LDPC code coding on the inputted bit stream.

Preferably, the rate matching unit S33 is adapted to perform rate matching through a convolutional code of a code rate ⅝.

Preferably, the rate matching unit S33 specifically includes: a first module, configured for receiving a convolutional code; and a second module, configured for transforming a convolutional code of a code rate ½ to be of a code rate ⅝ through puncturing.

Preferably, the second module is adapted to transform the convolutional code of a code rate ½ based on an octal generator 133, 171 to be of a code rate ⅝ through puncturing.

Preferably, the puncturing is implemented by deleting any location corresponding to an element 0 and reserving any location corresponding to an element 1 according to $$\left\{\begin{matrix}10111\\11101\end{matrix}\right\}.$$

Preferably, the puncturing is implemented by deleting any location corresponding to an element 0 and reserving any location corresponding to an element 1 according to $$\left\{\begin{matrix}11111\\11010\end{matrix}\right\}.$$

Preferably, the interleaving unit S35 includes: a third module configured for realizing the first substitution; and a fourth module configured for realizing the second substitution;

where, in the case of the sith space stream:

$i=(N_{cbsym}(si)/16)\cdot\mod(k,16)+\lfloor k/16 \rfloor, i, k=0,1,\ldots N_{cbpsym}-1;$ and the 1st substitution $j=\tilde{Q}(si)\times\lfloor i/\tilde{Q}(si)\rfloor+\mod\{[i+N_{cbpsym}(si)-\lfloor 16\times i/N_{cbpsym}(si)\rfloor],\tilde{Q}(si)\}.$ the 2nd substitution The operating principle and the related operation flow of the transmitter according to the tenth embodiment of the invention are basically the same as those in the implementation solutions of the above first to ninth embodiments, and thus will not be described again here.

An Eleventh Embodiment

Figure 22:
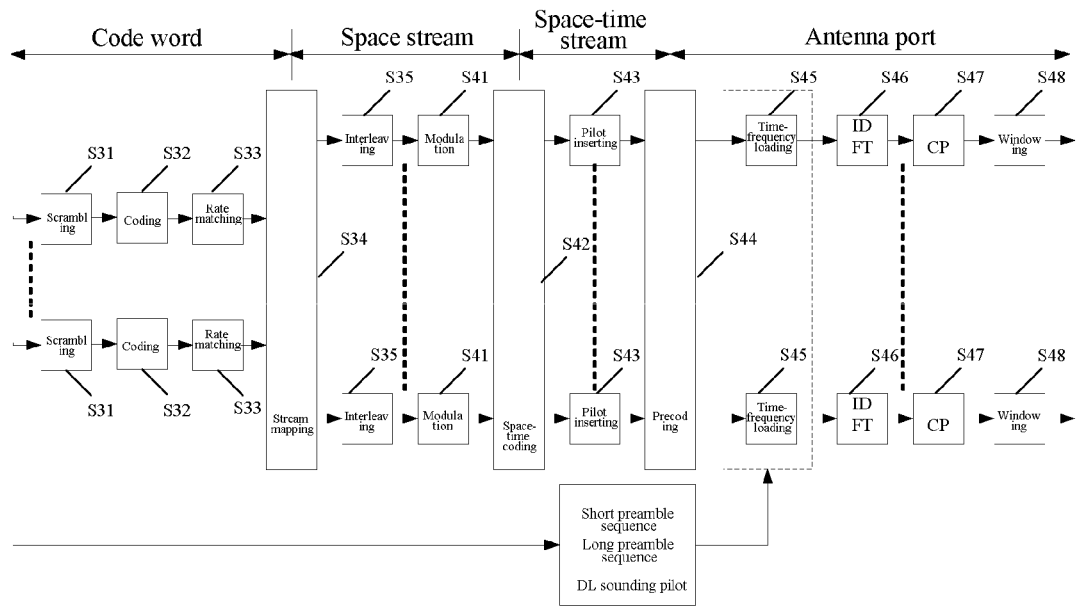
FIG. 22 is a block diagram of a CAP-side transmitter according to an eleventh embodiment of the invention.

FIG. 22 is a block diagram of a CAP-side transmitter according to the eleventh embodiment of the invention.

As shown in FIG. 22, the CAP-side transmitter includes: a scrambling unit S31, a coding unit S32, a rate matching unit S33, a stream mapping unit S34, an interleaving unit S35, a modulating unit S41, a space-time coding unit S42, a pilot inserting unit S43, a precoding unit S44, a time-frequency loading unit S45, an IDFT unit S46, a CP unit S47 and a windowing unit S48.

The operating principle and the related operation flow of the CAP-side transmitter according to the eleventh embodiment of the invention are basically the same as those in the implementation of the above first to eleventh embodiments, and thus will not be described again here.

Downlink multi-antenna transmission supports open-loop SU-MIMO, closed-loop SU-MIMO and closed-loop MU-MIMO.

Where, pilot inserting includes inserting a demodulation pilot and a phase track pilot.

The operating principle and the related operation flow of the transmitter according to the eleventh embodiment of the invention are basically the same as those in the implementation of the above first to eleventh embodiments, and thus will not be described again here.

A Twelfth Embodiment

Figure 23:
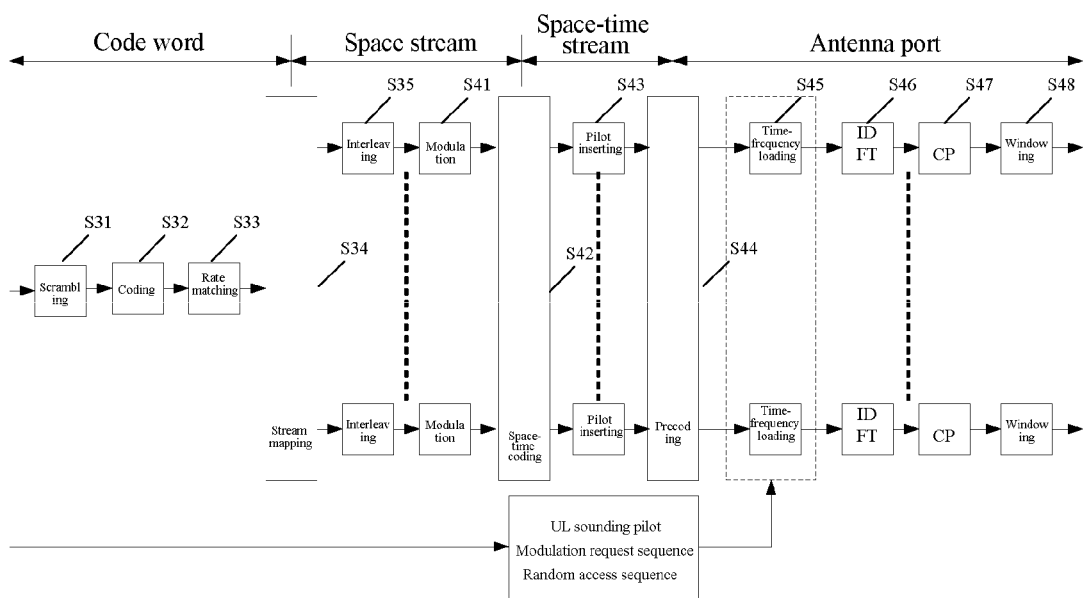
FIG. 23 is a block diagram of an STA-side transmitter according to a twelfth embodiment of the invention.

FIG. 23 is a block diagram of an STA-side transmitter according to the twelfth embodiment of the invention.

As shown in FIG. 23, the STA-side transmitter comprises: a scrambling unit S31, a coding unit S32, a rate matching unit S33, a stream mapping unit S34, an interleaving unit S35, a modulating unit S41, a space-time coding unit S42, a pilot inserting unit S43, a precoding unit S44, a time-frequency loading unit S45, an IDFT unit S46, a CP unit S47 and a windowing unit S48.

For uplink transmission, each user can only transmit one code word. Uplink multi-antenna transmission supports open-loop SU-MIMO.

Where, pilot inserting includes inserting a demodulation pilot and a phase track pilot.

The operating principle and the related operation flow of the transmitter according to the twelfth embodiment of the invention are basically the same as those in the implementation of the above first to tenth embodiments, and thus will not be described again here.

The invention proposes a general data transmission method for stream mapping, an apparatus for stream mapping, an apparatus for rate matching and a structure of a transmitter. With the technical solutions of the invention, in the case of high-order modulation and multi-stream in a closed-loop mode, the mapping is more uniform with and the gain is improved in comparison with the existing stream mapping method. With the method of the invention, the system performance of a wireless communication system can be further improved. The stream mapping scheme provided in the invention is simple and easy to implement.

It should be understood that the specific order or hierarchy of the steps in the process disclosed is only an example of the exemplary method. It should be understood that the specific order or hierarchy of the steps in the process may be re-arranged based on design preferences, without departing from the scope of the invention. The appended method claims provide various step factors in an exemplary order, but are not limited to the specific order or hierarchy.

In the above detailed description, various features are combined in a single embodiment for the sake of simplification of the disclosure. This disclosing manner should not be interpreted as reflecting such an intention that: the embodiment of the claimed subject requires more features than those stated clearly in each claim. On the contrary, as reflected in the appended claims, the invention may be in a state with less features than all features of a single disclosed embodiment. Therefore, the appended claims are hereby incorporated in the detailed description clearly, and each claim independently presents an individual preferred implementation solution of the invention.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word. Additionally, any term "or" used in the claims or the specification intends to represent a "nonexclusive or".

What is claimed is:

1. A method for a data transmission system, comprising:
   receiving a coded bit stream by a receiving unit of the data transmission system;
   mapping the coded bit stream to space streams by a mapping unit of the data transmission system; and
   performing a cyclic shift operation on coded bits mapped to each space stream by a cyclic shift unit of the data transmission system,
   wherein the cyclic shift operation is performed immediately after the coded bits are mapped to the each space stream, and wherein:
   a bit sequence $q_r^{si}$ of each space stream is outputted after performing a cyclic shift operation on coded bits $q_l^{si}$ mapped to the space stream in each OFDM symbol, wherein,
   $r=[l+si \cdot N_{cbpsc}(si) \cdot N_{shift}] \mod [N_{scpsym} \cdot N_{cbpsc}(si)]$;
   si represents a space stream index;

$l=0,1,2,\ldots,N_{scpsym} \cdot N_{cbpsc}(si)-1$;

$N_{scpsym}$ represents the number of data subcarriers of each OFDM symbol;
   $N_{cbpsc}(si)$ represents the number of coded bits carried by each subcarrier in the space stream; and
   $N_{shift}$ is a cyclic delay factor.

2. A method for a data transmission system, comprising:
   receiving a coded bit stream by a receiving unit of the data transmission system;
   mapping the coded bit stream to space streams by a mapping unit of the data transmission system; and
   performing a cyclic shift operation on coded bits mapped to each space stream by a cyclic shift unit of the data transmission system,
   wherein the cyclic shift operation is performed immediately after the coded bits are mapped to the each space stream, and wherein, a bit sequence $q_r^{si}$ of each space stream is output after performing a cyclic shift operation on coded bits $q_l^{si}$ mapped to the space stream in each OFDM symbol, wherein,
   $r=[l+si \cdot N_{cbpsc}(si) \cdot 37] \mod [N_{scpsym} \cdot N_{cbpsc}(si)]$;
   si represents a space stream index;

$l=0,1,2,\ldots,N_{scpsym} \cdot N_{cbpsc}(si)-1$;

$N_{scpsym}$ represents the number of data subcarriers of each OFDM symbol;
   $N_{cbpsc}(si)$ represents the number of coded bits carried by each subcarrier in the space stream.

3. A method for a data transmission system, comprising:
   receiving a coded bit stream by a receiving unit of the data transmission system;
   mapping the coded bit stream to space streams by a mapping unit of the data transmission system; and
   performing a cyclic shift operation on coded bits mapped to each space stream by a cyclic shift unit of the data transmission system,
   wherein the cyclic shift operation is performed immediately after the coded bits are mapped to the each space stream, and wherein, a bit is allocated to the sith space stream according to the following operation:

$$q_l^{si} = \begin{cases} \tilde{c}\left\lfloor \dfrac{l}{N_{cbpsc}(si)} \right\rfloor \cdot \sum_{n=0}^{N_{ss}-1} N_{cbpsc}(n) + & l \leq \text{Len\_cb}(si)-1 \\ \sum_{i=1}^{l-1} \left\lfloor \dfrac{l}{N_{cbpsc}(si)} \right\rfloor \cdot N_{cbpsc}(si) \overset{N_{ss}^{si}(i)+si}{} & \\ \text{non} & l > \text{Len\_cb}(si); \end{cases}$$

wherein,
si represents a space stream index, si=0, 1, 2 ... $N_{ss}-1$;
$\tilde{c}$ represents the inputted coded bit stream;

$q_l^{si}$ represents a transmitted bit at time l of the sith space stream outputted by the stream mapping;

$N_{ss}^{si}(i)$ represents the number of parallel space streams when the ith bit is transmitted from the sith space stream;

i represents bit indexes of the bits $q_l^{si}$ outputted after the stream mapping of the sith space stream, l=0, 1, 2 ... Len_cb(si)−1;

$n=0,1,2\ldots N_{ss}-1;$

Len_cb(si) represents the number of coded bits allocated to the space stream si, Len_cb(si)=$N_{sympss} \cdot N_{scpsym} \cdot N_{cbpsc}(si)$;

$N_{sympss}$ represents the number of OFDM symbols of each space stream;

$N_{scpsym}$ represents the number of data subcarriers of each OFDM symbol;

$N_{cbpsc}(si)$ represents the number of coded bits carried by each subcarrier in the space stream;

$N_{cbpss}(si)$ represents the number of coded bits carried by each OFDM symbol in the sith space stream $N_{cbpss}(Si)=N_{scpsym} \cdot N_{cbpsc}(si)$; and non represents nonexistence of a bit.

4. The method of claim 3, further comprising:
   dividing Len_cb(si) bits into $N_{sympss} \cdot N_{scpsym}$ allocation periods, wherein, in each allocation period: for EQM modulation, $N_{ss}^{si}(i)=N_{ss}^{si}(j)$ 0≤i, j<Len_cb(si)−1; and for UEQM modulation, a sequence of inputted bits for the stream mapping are in a period of $$\sum_{si=0}^{N_{ss}-1} N_{cbpsc}(si),$$

and allocated sequentially among all space streams bit by bit;

wherein, for one allocation period, when $N_{cbpsc}(si)$ bits are allocated to the sith space stream, the sith space stream quits subsequent stream mapping stages in the current allocation period; and in the next bit sequence period, the allocation process of the previous bit sequence period is repeated.

5. The method of claim 3, wherein the algorithm of calculating $N_{ss}^{si}(i)$ is as follows:

the coded bit stream is divided into $$N_{block} = \frac{N_{sympss} \sum_{si=0}^{Nss-1} N_{cbpss}(si)}{\sum_{si=0}^{Nss-1} N_{cbsc}(si)} = N_{sympss} N_{scpsym}$$

allocation periods by taking the number $$\sum_{si=0}^{Nss-1} N_{cbpsc}(si)$$

of coded bits corresponding to one subcarrier of each OFDM symbol as the allocation period; bit-by-bit subcarrier allocation is performed in each allocation period successively; the number of parallel space streams when the jth bit is allocated to the sith space stream in the first allocation period is defined as $N_{ss}^{base}(j)$, and each space stream can be allocated with at most $N_{cbpsc}(si)$ bits; then, the number of parallel space streams $N_{ss}^{si}(i)$ when the ith bit is allocated to the sith space stream is obtained according to a formula $$N_{si}^{ss}=N_{ss}^{base}(i \bmod N_{cbpsc}(si));$$ wherein, $N_{cbpss}(si)$ represents the number of coded bits carried by each OFDM symbol in the sith space stream, $N_{cbpss}(si)=N_{scpsym} \cdot N_{cbpsc}(si)$;

$N_{cbpsc}(si)$ represents the number of coded bits carried by each subcarrier in the sith space stream;

$N_{sympss}$ represents the number of OFDM symbols of each space stream;

$N_{scpsym}$ represents the number of data subcarriers of each OFDM symbol;

by taking the first allocation period as an example, the method for calculating $N_{ss}^{base}(j)$ is as follows:

first of all, an allocation stage number P is calculated according to the overall number of space streams $N_{ss}$ and a modulation order S of each space stream, wherein the number of space streams and bit occurrences are different from an allocation stage to another allocation stage, specifically as follows:

$$|S| = \sum_{i=0}^{N_{ss}-1} N_{cbpsc}(si),$$

S represents a set of modulation bit numbers of each space stream, $$S=\{N_{cbpsc}(0), N_{cbpsc}(1), N_{cbpsc}(2), \ldots, N_{cbpsc}(N_{ss}-1)\};$$

a set A=unique(S) is calculated; wherein unique represents a set of numbers of different elements contained in the set S;

a set B=sort(A) is calculated; wherein sort represents sorting the elements of the set A from small to large; the allocation stage number is calculated as P=length(B); and each element in the set B represents the minimum modulation order of a stage for the element correspondingly;

then, the bit occurrence in each allocation stage is calculated, specifically as follows:

the occurrence of the Pth stage is calculated as C(p)=B(p)−B(p−1); wherein, when p=0 at the 0th stage, then B(−1)=0, i.e., C(0)=B(0);

the number of parallel space streams $M_{ss}^{base}(p)$ of each stage is determined in sequence according to the above allocation stage number P calculated; then, the allocation stage for the jth bit allocated to each stream is determined, specifically as follows:

first of all, the number of parallel space streams $M_{ss}^{base}(p)$ in the stage p=0 is determined, $$M_{ss}^{base}(0)=sum(S \geq B(0));$$

then, the bit range of the stage p=0 is calculated as [0, K(0)], wherein K(0)=C(0)−1, and if j belongs to this range, it is regarded that j belongs to the 0th stage;

the number of parallel space streams $M_{ss}^{base}(1)=sum(S \geq B(1))$ of the stage p=1 can be likewise determined;

then, the bit range of the 1st stage is calculated as [K(0)+1, K(1)], wherein, K(1)=K(0)+C(1);

the bit range of each subsequent stage is likewise calculated in sequence; in conclusion, the allocation stage for the jth bit is determined according to a formula P=g(j), wherein, $$g(j) = \begin{cases} 0, & 0 <= j <= K(0) \\ 1, & K(0)+1 <= j <= K(1) \\ \ldots \\ p, & K(p-1)+1 <= j <= K(p) \\ \ldots \\ P-1, & K(P-2)+1 <= j <= K(P-1) \end{cases}$$

then, $N_{ss}^{base}(j)$ is obtained according to a formula $N_{ss}^{base}(j) = M_{ss}^{base}(g(j))$.

6. A method for a data transmission system, comprising:
receiving a coded bit stream by a receiving unit of the data transmission system;
mapping the coded bit stream to space streams by a mapping unit of the data transmission system; and
performing a cyclic shift operation on coded bits mapped to each space stream by a cyclic shift unit of the data transmission system,
wherein the cyclic shift operation is performed immediately after the coded bits are mapped to the each space stream, and wherein, for the sith space stream, the coded bit stream is mapped to the space streams according to the following operation:

$$\Omega^{si} \in I = \left\{ k \mid k \in \left[ 0, 1, 2, \ldots, N_{sympss} \cdot \sum_{si=0}^{Nss-1} N_{cbpss}(si) - 1 \right] \right\};$$

I represents a set of subscripts of the inputted coded stream;
k represents an index order of an inputted coded bit stream $\tilde{c}_k$ before stream mapping;
$\Omega^{si}$ represents a set of bit indexes k of the original coded bit stream corresponding to the bits of the sith space stream after stream mapping, wherein elements in the set $\Omega^{si}$ are calculated by the following formula:

$$\Omega^{si} =$$

$$\left\{ k \mid k = f^{si}(l) = \left\lfloor \frac{l}{N_{cbpsc}(si)} \right\rfloor \sum_{n=0}^{Nss-1} N_{cbsc}(n) + \sum_{i=\left\lfloor \frac{i}{N_{cbpsc}(si)} \right\rfloor \cdot N_{cbpsc}(si)}^{l-1} N_{ss}^{si}(i) + si; \right.$$

wherein, $$l \in \{0, 1, \ldots, N_{sympss} \cdot N_{scpsym} \cdot N_{cbpsc}(si) - 1\}\};$$

$$f^{si}(l) = k$$

$$= \left\lfloor \frac{l}{N_{cbpsc}(si)} \right\rfloor \sum_{n=0}^{Nss-1} N_{cbpsc}(n) + \sum_{i=\left\lfloor \frac{i}{N_{cbpsc}(si)} \right\rfloor \cdot N_{cbpsc}(si)}^{l-1} N_{ss}^{si}(i) + si$$

$$= \left\lfloor \frac{l}{N_{cbpsc}(si)} \right\rfloor \sum_{n=0}^{Nss-1} N_{cbpsc}(n) + \sum_{j=0}^{mod(l, N_{cbpsc}(si))-1} N_{ss}^{base}(j) + si;$$

si represents a space stream index, si=0, 1, 2 ... $N_{ss}$−1;
k represents an index order of the inputted coded bit stream $\tilde{c}_k$ before stream mapping;
$N_{ss}^{si}(i)$ represents the number of parallel space streams when the ith bit is transmitted from the sith space stream;

$N_{ss}^{base}(j)$ represents the number of parallel space streams when the jth bit is allocated to the sith space stream in the first allocation period, and at most $N_{cbpsc}(si)$ bits can be allocated to each space stream;
$N_{cbpss}(si)$ represents the number of coded bits carried by each OFDM symbol in the sith space stream;

$$N_{cbpss}(si) = N_{scpsym} \cdot N_{cbpsc}(si);$$

$N_{cbpsc}(si)$ represents the number of coded bits carried by each subcarrier in the sith space stream;
$N_{scpsym}$ represents the number of data subcarriers of each OFDM symbol; and
$N_{sympss}$ represents the number of OFDM symbols of each space stream;
wherein, the algorithm of calculating $N_{ss}^{si}(i)$ is as follows:
the coded bit stream is divided into $$N_{block} = \frac{N_{sympss} \sum_{si=0}^{Nss-1} N_{cbpss}(si)}{\sum_{si=0}^{Nss-1} N_{cbpsc}(si)} = N_{sympss} N_{scpsym}$$

allocation periods by taking the number $$\sum_{si=0}^{Nss-1} N_{cbsc}(si)$$

of coded bits corresponding to one subcarrier of each OFDM symbol as the allocation period; bit-by-bit subcarrier allocation is performed in each allocation period successively; the number of parallel space streams when the jth bit is allocated to the sith space stream in the first allocation period is defined as $N_{ss}^{base}(j)$, and each space stream can be allocated with at most $N_{cbpsc}(si)$ bits; then, the number of parallel space streams $N_{ss}^{si}(i)$ when the ith bit is allocated to the sith space stream is obtained according to a formula $$N_{ss}^{si} = N_{ss}^{base}(i \bmod N_{cbpsc}(si)); \text{ wherein,}$$

$N_{cbpss}(si)$ represents the number of coded bits carried by each OFDM symbol in the sith space stream, $N_{cbpss}(si) = N_{scpsym} \cdot N_{cbpsc}(si)$;
$N_{cbpsc}(si)$ represents the number of coded bits carried by each subcarrier in the sith space stream;
$N_{sympss}$ represents the number of OFDM symbols of each space stream;
$N_{scpsym}$ represents the number of data subcarriers of each OFDM symbol;
by taking the first allocation period as an example, the method for calculating $N_{ss}^{base}(j)$ is as follows:
first of all, an allocation stage number P is calculated according to the overall number of space streams $N_{ss}$ and a modulation order S of each space stream, wherein the number of space streams and bit occurrences are different from an allocation stage to another allocation stage, specifically as follows:

$$|S| = \sum_{i=0}^{Nss-1} N_{cbpsc}(si),$$

S represents a set of modulation bit numbers of each space stream, $$S\{N_{cbpsc}(0), N_{cbpsc}(1), N_{cbpsc}(2), \ldots, N_{cbpsc}(N_{ss}-1)\};$$

a set A=unique(S) is calculated; wherein unique represents a set of numbers of different elements contained in the set S;
a set B=sort(A) is calculated; wherein sort represents sorting the elements of the set A from small to large; the allocation stage number is calculated as P=length(B); and each element in the set B represents the minimum modulation order of a stage for the element correspondingly;
then, the bit occurrence in each allocation stage is calculated, specifically as follows:
the occurrence of the pth stage is calculated as C(p)=B(p)−B(p−1); wherein, when p=0 at the 0th stage, then B(−1)=0, i.e., C(0)=B(0);
the number of parallel space streams $M_{ss}^{base}(p)$ of each stage is determined in sequence according to the above allocation stage number P calculated; then, the allocation stage for the jth bit allocated to each stream is determined, specifically as follows:
first of all, the number of parallel space streams $M_{ss}^{base}(p)$ in the stage p=0 is determined, $$M_{ss}^{base}(0)=\text{sum}(S \geq B(0));$$

then, the bit range of the stage p=0 is calculated as [0, K(0)], wherein, K(0)=C(0)−1, and if j belongs to this range, it is regarded that j belongs to the 0th stage;
the number of parallel space streams $M_{ss}^{base}(1)=\text{sum}(S \geq B(1))$ of the stage p=1 can be likewise determined;
then, the bit range of the 1st stage is calculated as [K(0)+1, K(1)], wherein, K(1)=K(0)+C(1);
the bit range of each subsequent stage is likewise calculated in sequence; in conclusion, the allocation stage for the jth bit is determined according to a formula P=g(j), wherein, $$g(j) = \begin{cases} 0, & 0 \leq j \leq K(0) \\ 1, & K(0)+1 \leq j \leq K(1) \\ \ldots \\ p, & K(p-1)+1 \leq j \leq K(p) \\ \ldots \\ P-1, & K(P-2)+1 \leq j \leq K(P-1) \end{cases}$$

then, $N_{ss}^{base}(j)$ is obtained according to a formula $N_{ss}^{base}(j) = M_{ss}^{base}(g(j))$.

7. An apparatus for realizing stream mapping, comprising:
a receiving unit, configured for receiving a coded bit stream;
a mapping unit, configured for mapping the coded bit stream to space streams; and
a cyclic shift unit, configured for performing a cyclic shift operation on coded bits mapped to each space stream,
wherein the cyclic shift operation is performed immediately after the coded bits are mapped to the each space stream, wherein, the cyclic shift unit outputs a bit sequence $q_r^{si}$ of each space stream after performing a cyclic shift operation on coded bits $q_l^{si}$ mapped to the space stream in each OFDM symbol, wherein, $$r = [l + si \cdot N_{cbpsc}(si) \cdot N_{shift}] \mod [N_{scpsym} \cdot N_{cbpsc}(si)];$$

si represents a space stream index;

$l = 0, 1, 2, \ldots, N_{scpsym} \cdot N_{cbpsc}(si) - 1;$ $N_{scpsym}$ represents the number of data subcarriers of each OFDM symbol;

$N_{cbpsc}(si)$ represents the number of coded bits carried by each subcarrier in the sith space stream; and $N_{shift}$ represents a cyclic delay factor.

8. An apparatus for realizing stream mapping, comprising:
a receiving unit, configured for receiving a coded bit stream;
a mapping unit, configured for mapping the coded bit stream to space streams; and
a cyclic shift unit, configured for performing a cyclic shift operation on coded bits mapped to each space stream,
wherein the cyclic shift operation is performed immediately after the coded bits are mapped to the each space stream, wherein, the cyclic shift unit outputs a bit sequence $q_r^{si}$ of each space stream after performing a cyclic shift operation on coded bits $q_l^{si}$ mapped to the space stream in each OFDM symbol, wherein, $$r = [l + si \cdot N_{cbpsc}(si) \cdot 37] \mod [N_{scpsym} \cdot N_{cbpsc}(si)];$$

si represents a space stream index;

$l = 0, 1, 2, \ldots, N_{scpsym} \cdot N_{cbpsc}(si) - 1;$ $N_{scpsym}$ represents the number of data subcarriers of each OFDM symbol; and $N_{cbpsc}(si)$ represents the number of coded bits carried by each subcarrier in the sith space stream.

9. An apparatus for realizing stream mapping, comprising:
a receiving unit, configured for receiving a coded bit stream;
a mapping unit, configured for mapping the coded bit stream to space streams; and
a cyclic shift unit, configured for performing a cyclic shift operation on coded bits mapped to each space stream,
wherein the cyclic shift operation is performed immediately after the coded bits are mapped to the each space stream, wherein, the mapping unit allocates a bit to the ith space stream as follows:

$$q_l^{si} = \begin{cases} \tilde{c}_{\left\lfloor \frac{l}{N_{cbpsc}(si)} \right\rfloor \cdot \sum_{n=0}^{N_{ss}-1} N_{cbpsc}(n) + \sum_{i=0}^{l-1} \left\lfloor \frac{l}{N_{cbpsc}(si)} \right\rfloor \cdot N_{cbpsc}(si)^{N_{ss}^{si}(i)+si}} & l \leq \text{Len\_cb}(si) - 1 \\ \text{non} & l > \text{Len\_cb}(si); \end{cases}$$

wherein,
si represents a space stream index, si=0, 1, 2 ... $N_{ss}$−1;
$\tilde{c}$ represents the inputted coded bit stream;
$q_l^{si}$ represents a transmitted bit at time l of the sith space stream output by the stream mapping;
n=0, 1, 2 ... $N_{ss}$−1;
$N_{ss}^{si}(i)$ represents the number of parallel space streams when the ith bit is transmitted from the sith space stream;
i represents bit indexes of the bits $q_l^{si}$ outputted after the stream mapping of the sith space stream, l=0, 1, 2 ... Len_cb(si)−1;
Len_cb(si) represents the number of coded bits allocated to the space stream,
Len_cb(si)=$N_{sympss} \cdot N_{scpsym} \cdot N_{cbpsc}(si)$;
$N_{sympss}$ represents the number of OFDM symbols of each space stream;
$N_{scpsym}$ represents the number of data subcarriers of each OFDM symbol;
$N_{cbpsc}(si)$ represents the number of coded bits carried by each subcarrier in the sith space stream;
$N_{cbpss}(si)$ represents the number of coded bits carried by each OFDM symbol in the sith space stream, $N_{cbpss}(si) = N_{scpsym} \cdot N_{cbpsc}(si)$;
non represents nonexistence of a bit.

10. A transmitter comprising:
a scrambling unit, configured for scrambling an inputted data bit stream;
a channel coding unit, configured for coding the scrambled data bit stream;
a rate matching unit, configured for performing rate matching on the coded bit stream;
a stream mapping unit, configured for mapping the coded bit stream subjected to the rate matching to space streams; and
an interleaving unit, configured for performing an interleaving operation on each space stream respectively,
wherein, the stream mapping unit is further adapted to perform a cyclic shift operation on coded bits mapped to each space stream; and
wherein the cyclic shift operation is performed immediately after the coded bits are mapped to the each space stream, wherein, the scrambling unit comprises a receiving module, a scrambling module and an outputting module; wherein:

the scrambling module scrambles a data bit sequence $[b_0 b_1 \ldots b_{Len\_bit-1}]$ by a scrambling sequence which is a binary sequence $[s_0 s_1 \ldots s_{Len\_bit-1}]$ outputted by a maximum length linear feedback shift register with a generator polynomial $1+X^{11}+X^{15}$, specifically, an Exclusive-OR operation is performed on the data bit sequence and the scrambling sequence according to the following formula bit by bit to obtain a scrambled bit sequence $[\tilde{b}_0 \tilde{b}_1 \ldots \tilde{b}_{Len\_bit-1}]$, $\tilde{b}_i = (b_i + s_i) \bmod 2$ i=0, 1, ... Len_bit−1,
  wherein
  $1+X^{11}+X^{15}$ represents a generator polynomial used for generating a scrambling sequence.

\* \* \* \* \*